United States Patent
Reyes

(10) Patent No.: US 8,367,918 B2
(45) Date of Patent: Feb. 5, 2013

(54) TRSERIES DRUM RACK SYSTEM-ACOUSTIC AND/OR ELECTRONIC DRUM MOUNTING RACK WITH EIGHT-SIDED PIPING AND INTERLOCKING CLAMPS

(76) Inventor: Antonio Reyes, Lorain, OH (US)

( * ) Notice: Subject to any disclaimer, the term of this patent is extended or adjusted under 35 U.S.C. 154(b) by 0 days.

(21) Appl. No.: 12/803,669

(22) Filed: Jul. 1, 2010

(65) Prior Publication Data

US 2011/0126693 A1 Jun. 2, 2011

Related U.S. Application Data

(60) Provisional application No. 61/283,226, filed on Dec. 1, 2009.

(51) Int. Cl.
*G10D 13/02* (2006.01)
(52) U.S. Cl. ........................ 84/421; 84/411 R
(58) Field of Classification Search ................ 84/411 R, 84/421
See application file for complete search history.

(56) References Cited

U.S. PATENT DOCUMENTS

| | | | | |
|---|---|---|---|---|
| 3,955,788 A * | 5/1976 | Delage | ....................... | 248/228.3 |
| 4,123,095 A | 10/1978 | Stehlin | | |
| 4,579,229 A | 4/1986 | Porcaro | | |
| 4,583,359 A * | 4/1986 | Staeger | ........................ | 52/653.2 |
| 5,337,646 A | 8/1994 | Austin | | |
| 5,353,674 A | 10/1994 | Volpp | | |
| 5,520,292 A | 5/1996 | Lombardi | | |
| 5,929,355 A | 7/1999 | Adinolfi | | |
| 5,949,008 A | 9/1999 | Augsburger | | |
| 6,102,358 A * | 8/2000 | McLeary | ....................... | 248/604 |
| 6,349,912 B1 * | 2/2002 | Schauss et al. | ............ | 248/298.1 |
| 6,648,376 B2 | 11/2003 | Christianson | | |
| 6,854,314 B2 * | 2/2005 | Cleave et al. | ................... | 72/319 |
| 2002/0108918 A1 * | 8/2002 | Pyle | ............................ | 211/85.6 |

OTHER PUBLICATIONS

David Pressman, Patent it Yourself, 2009, 14$^{th}$ edition.

* cited by examiner

*Primary Examiner* — Kimberly Lockett

(57) ABSTRACT

One embodiment of a drum rack system device of the type having an octagonal rail member (1), has internal muffling or foam (2), attached to a clamping body (3), and is secured with a screw (4). The clamping body (3) is secured to a clamping arm (6) with a pin (5). The clamping body (3) contains housing for a swiveling t-nut (8). A tension rod (9) will pass through a concave washer (10). In addition, a cylinder (11) will pass through a hole in an easy locking lever (12) and the tension rod (9) will pass through and screw into the swiveling hardware (8). The completed assembly will clamp on to a round tube leg rack, allow height adjustability, and fold up with a flip of an easy locking lever. There is a raised-geared teeth (13) design on the top and bottom face of the clamp portions that will interlock at various and precise angles with other geared clamps. Other embodiments are described and shown.

1 Claim, 38 Drawing Sheets

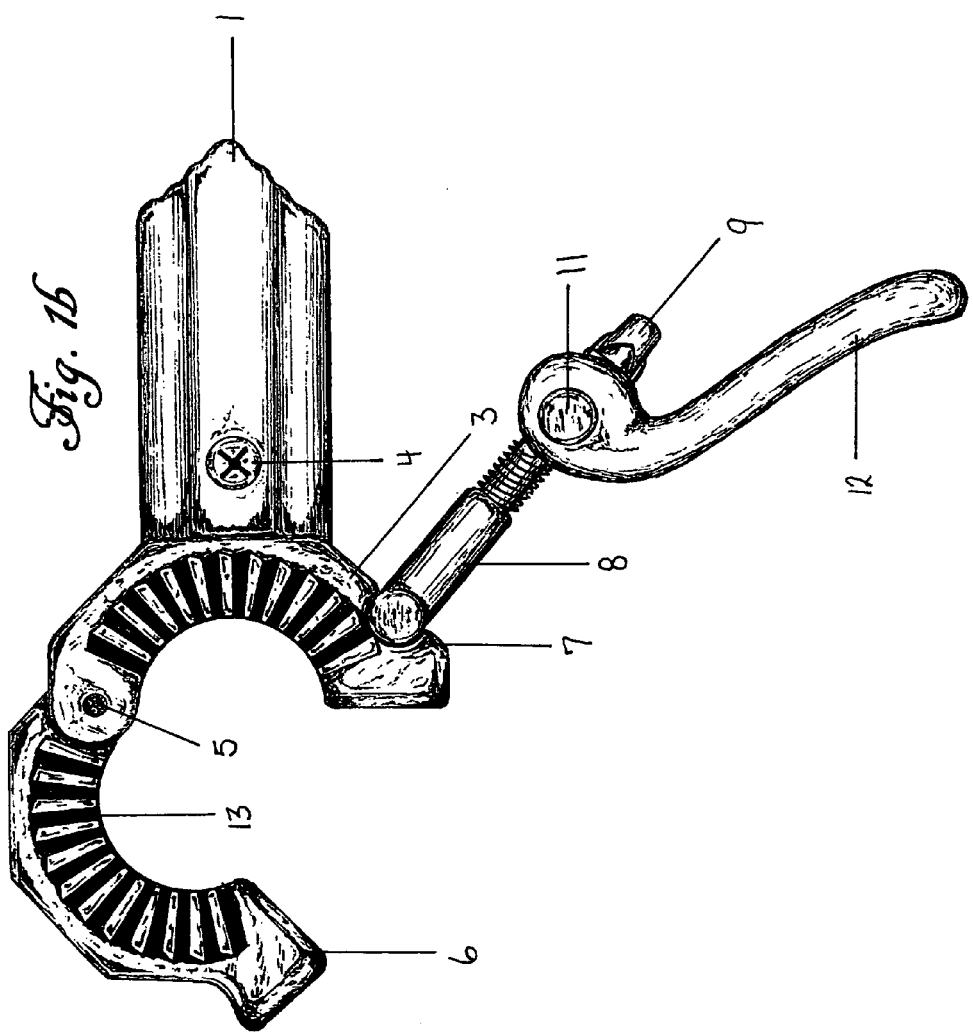

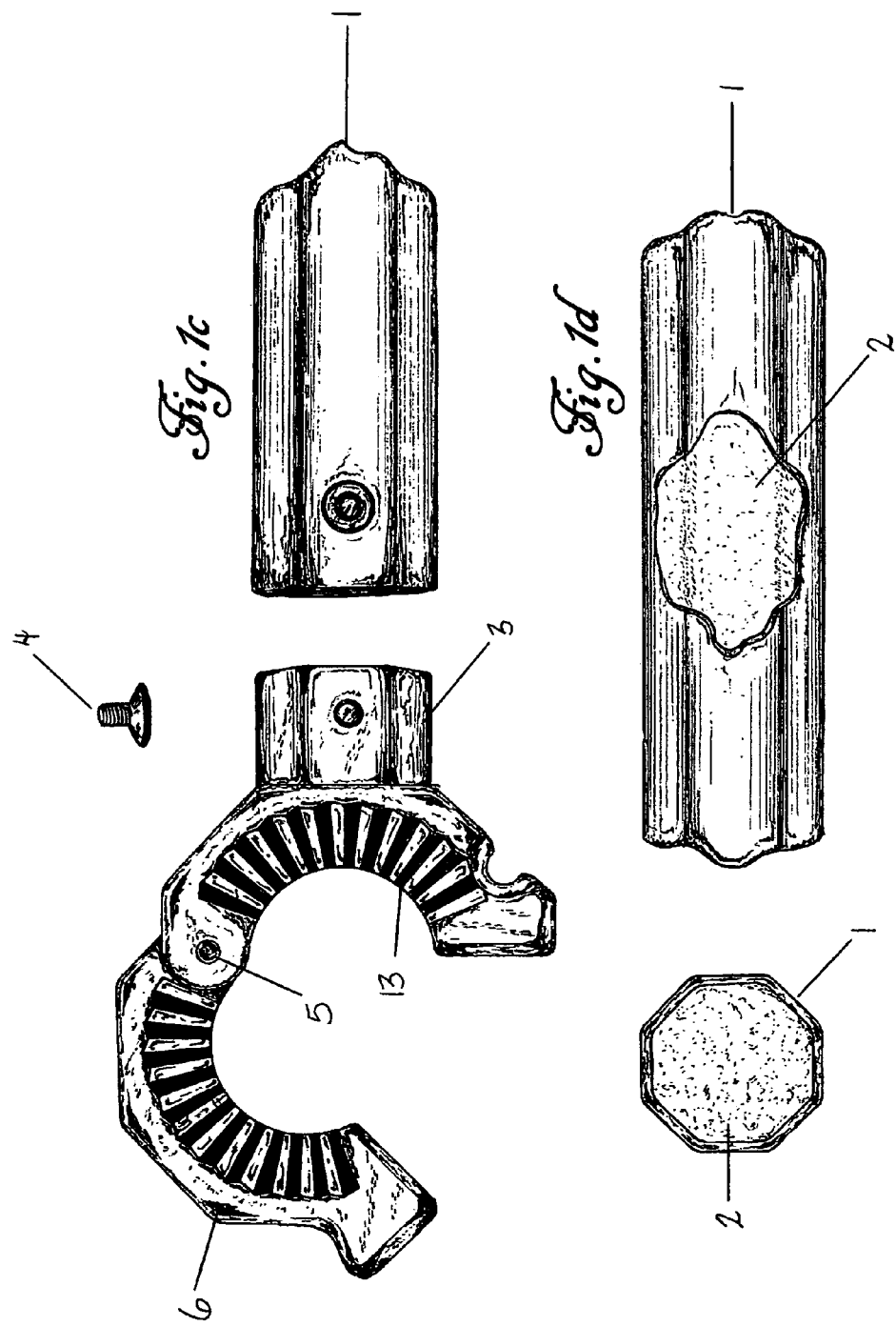

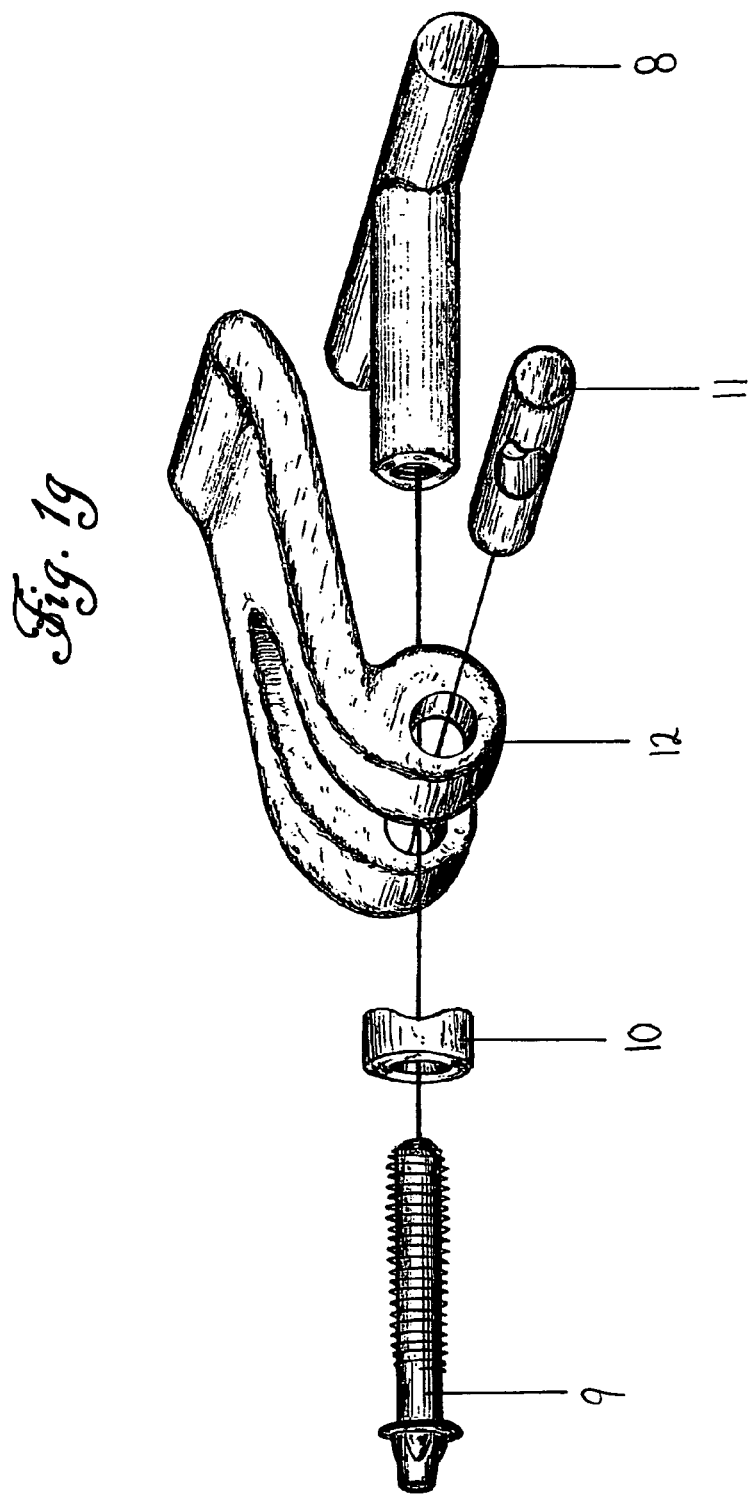

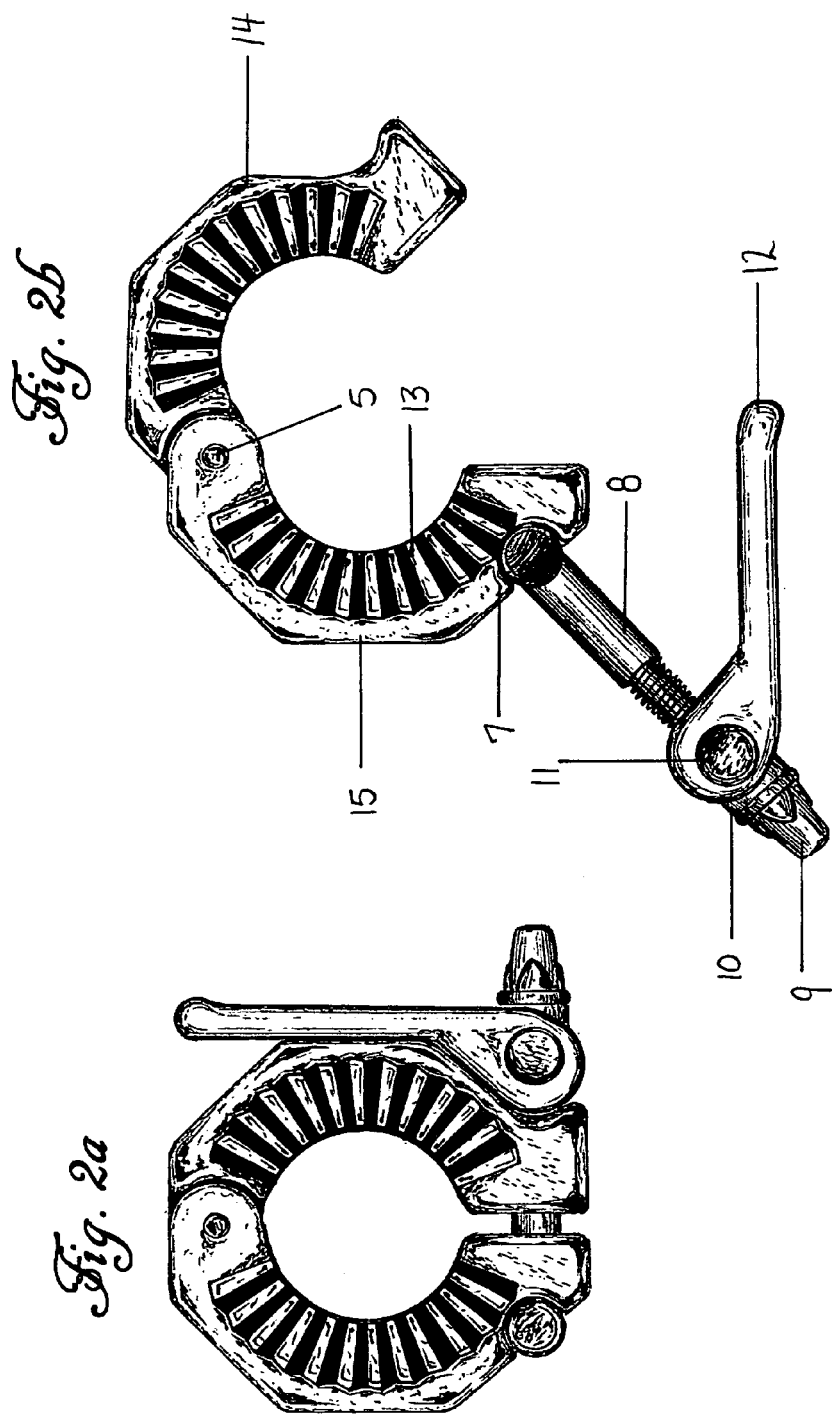

Figure 1A:
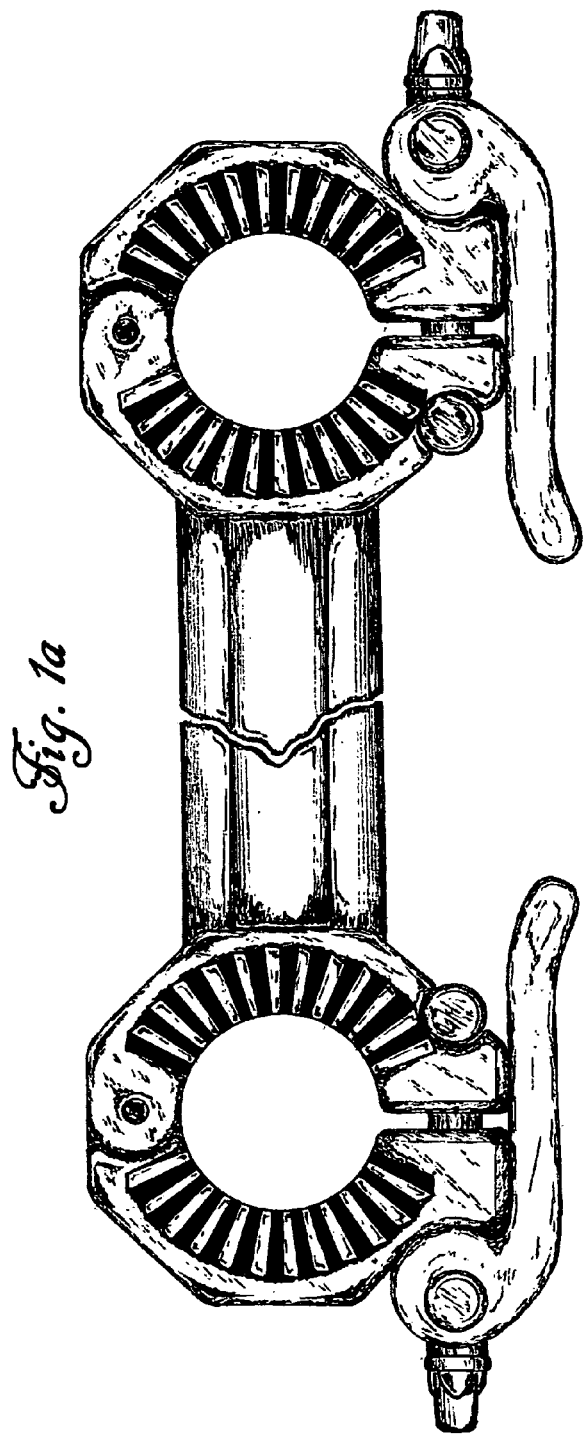

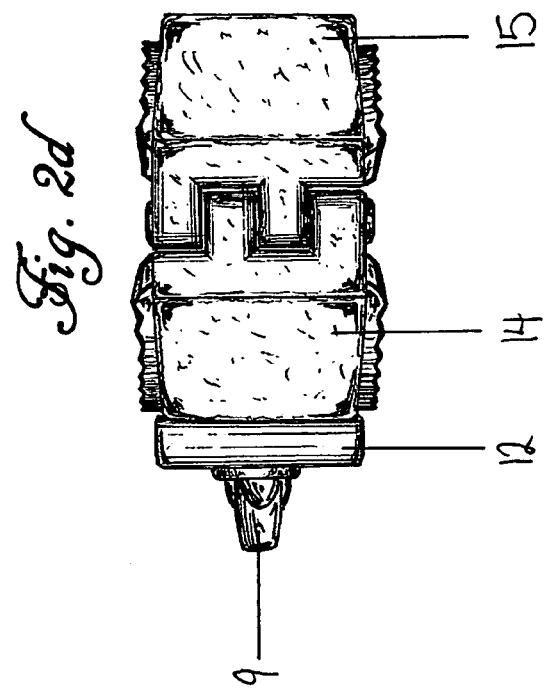
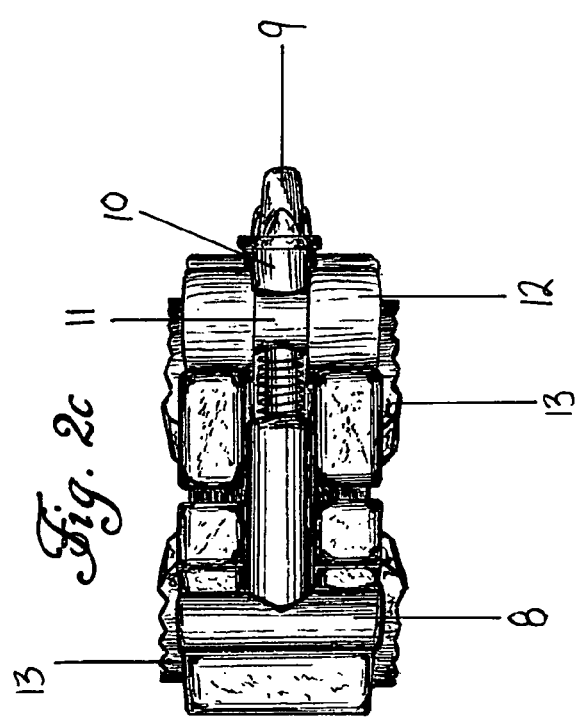

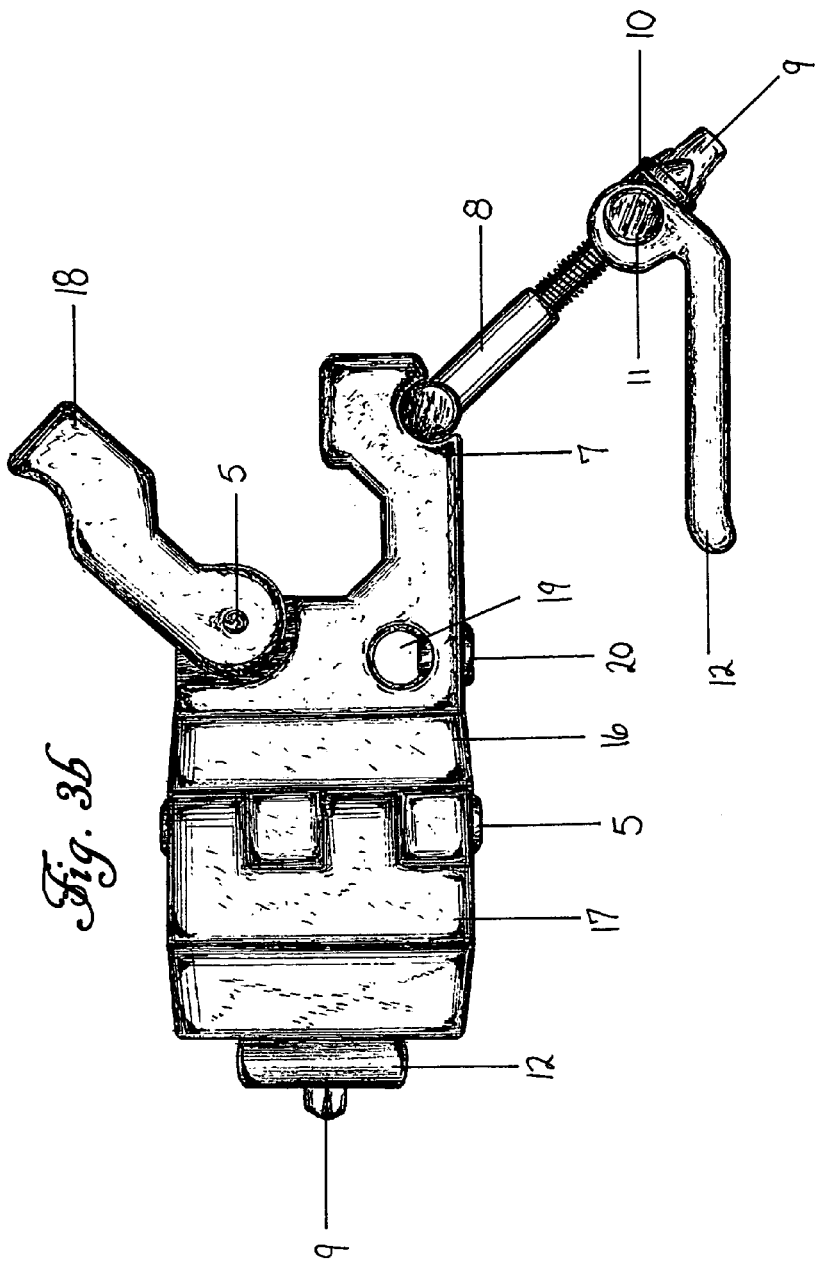

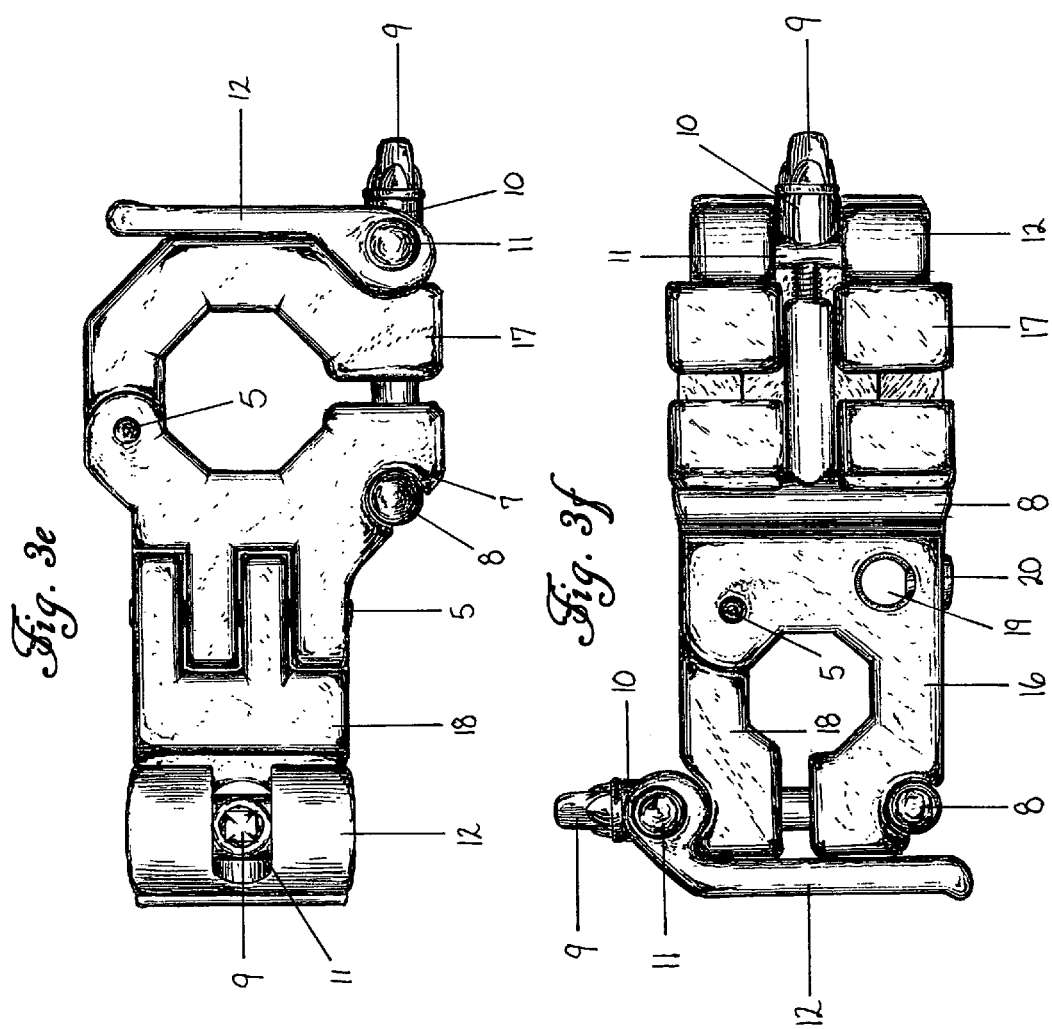

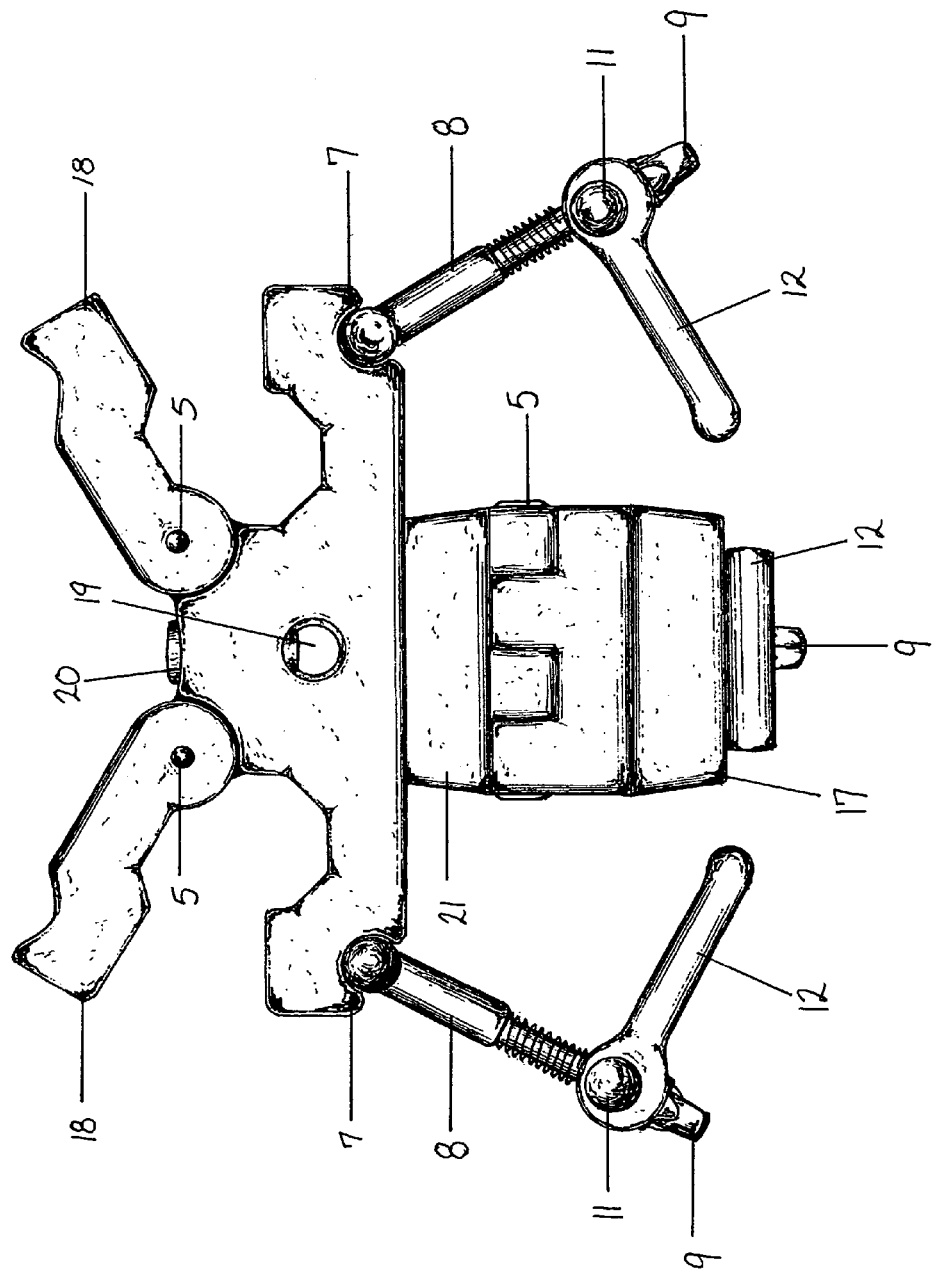

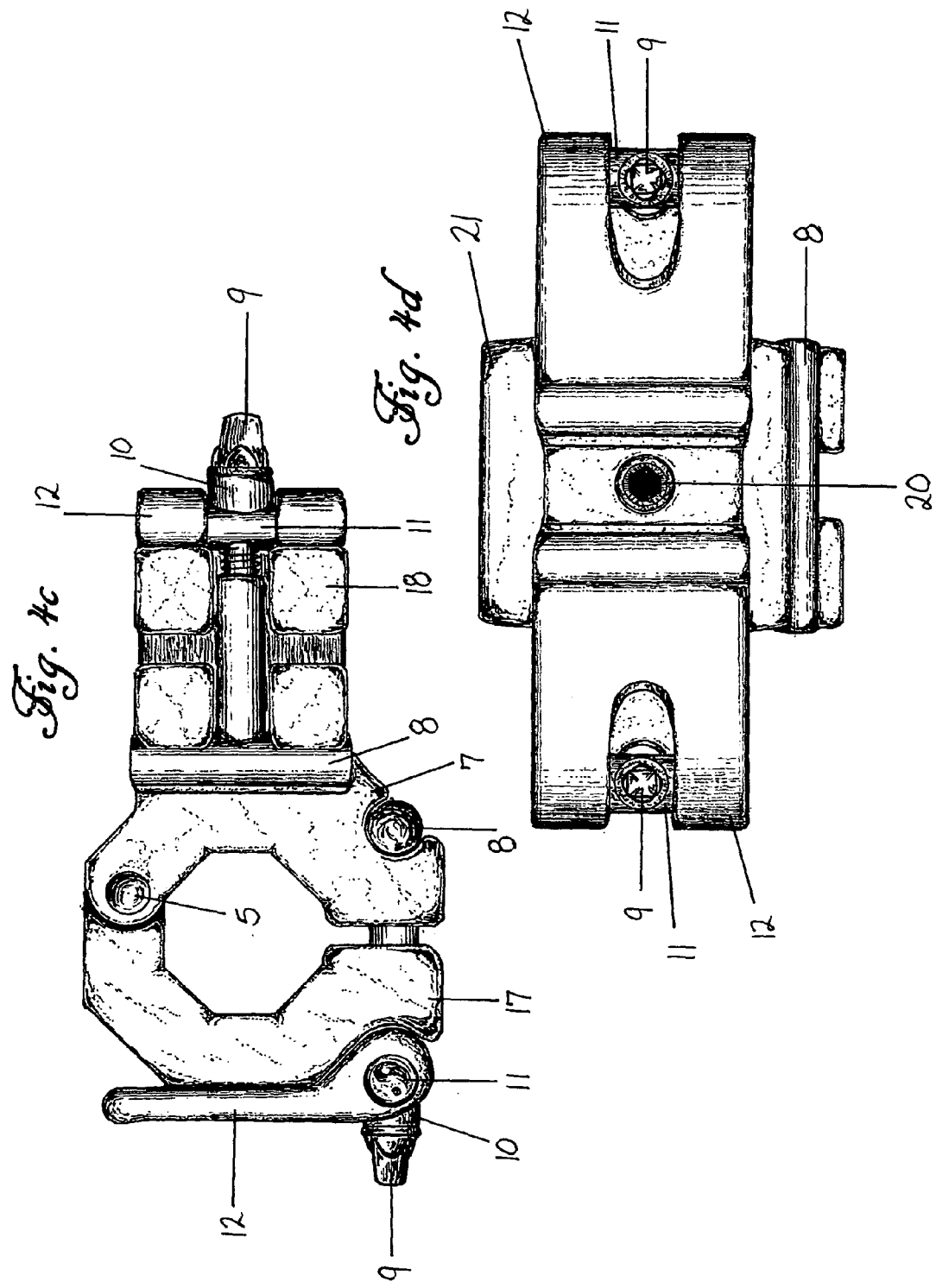

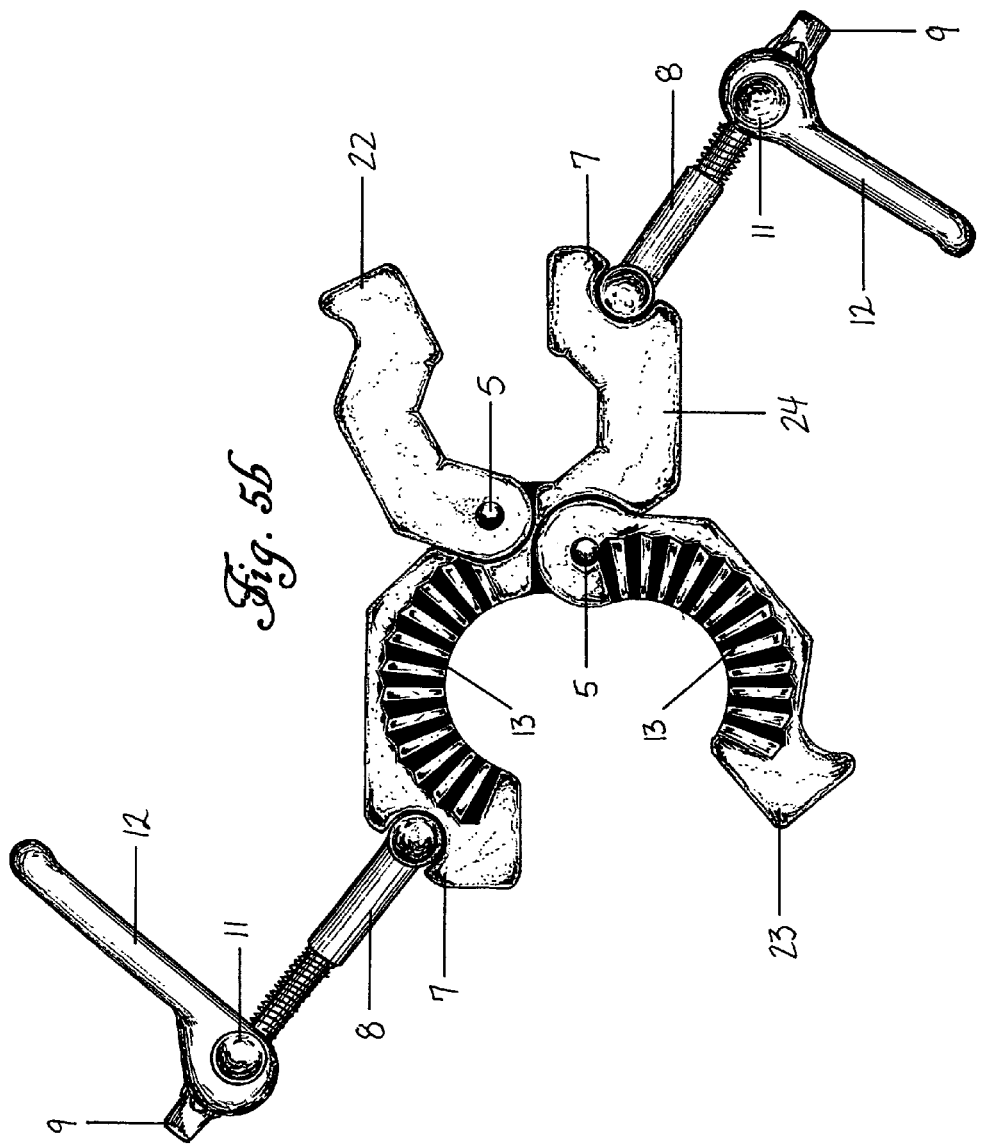

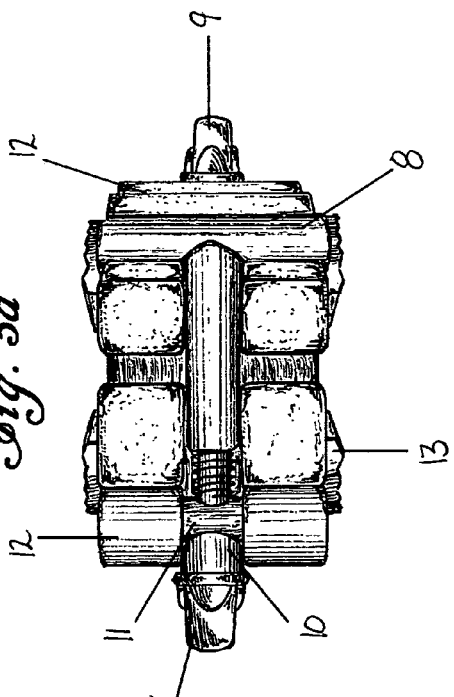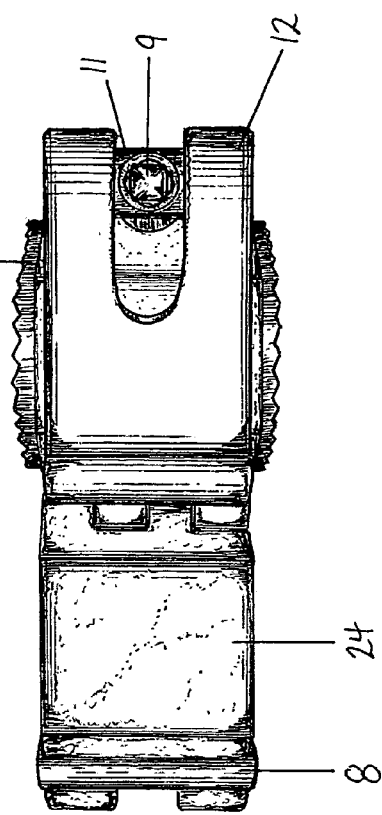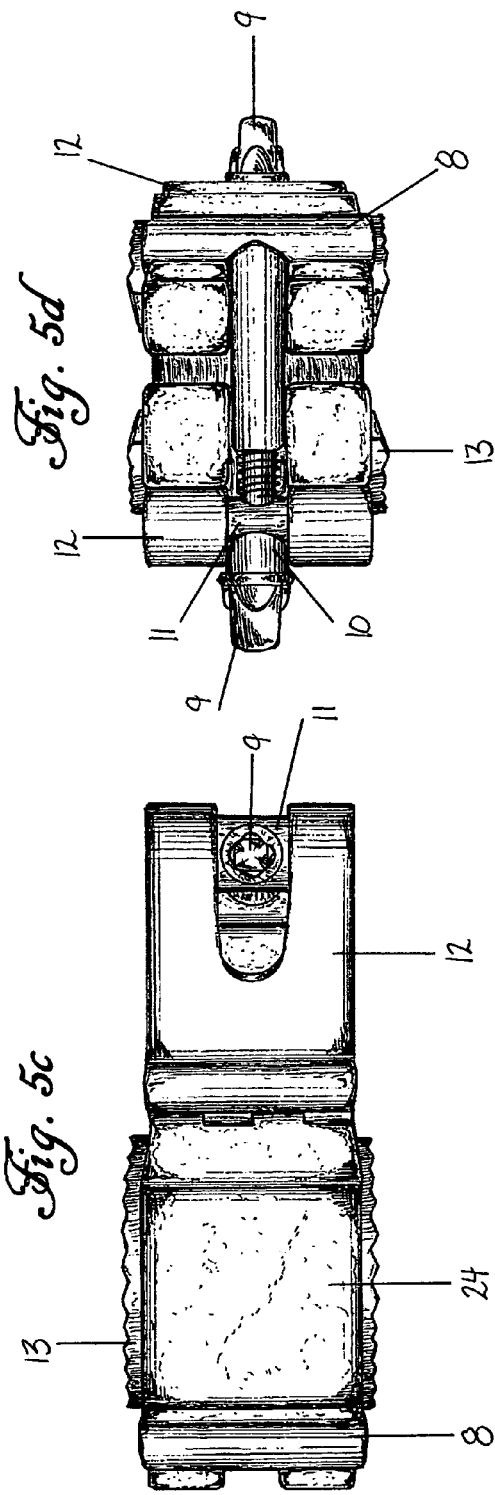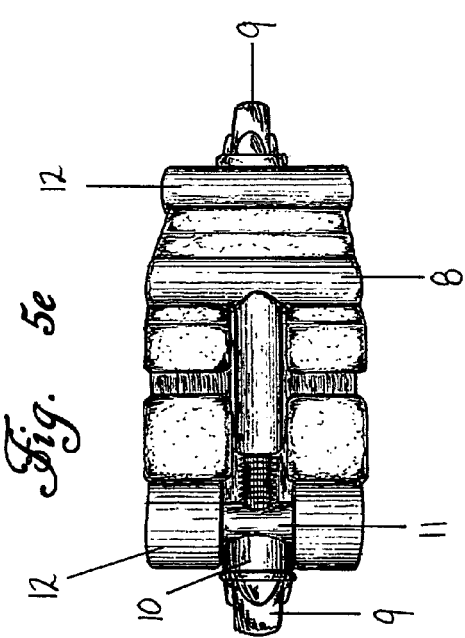

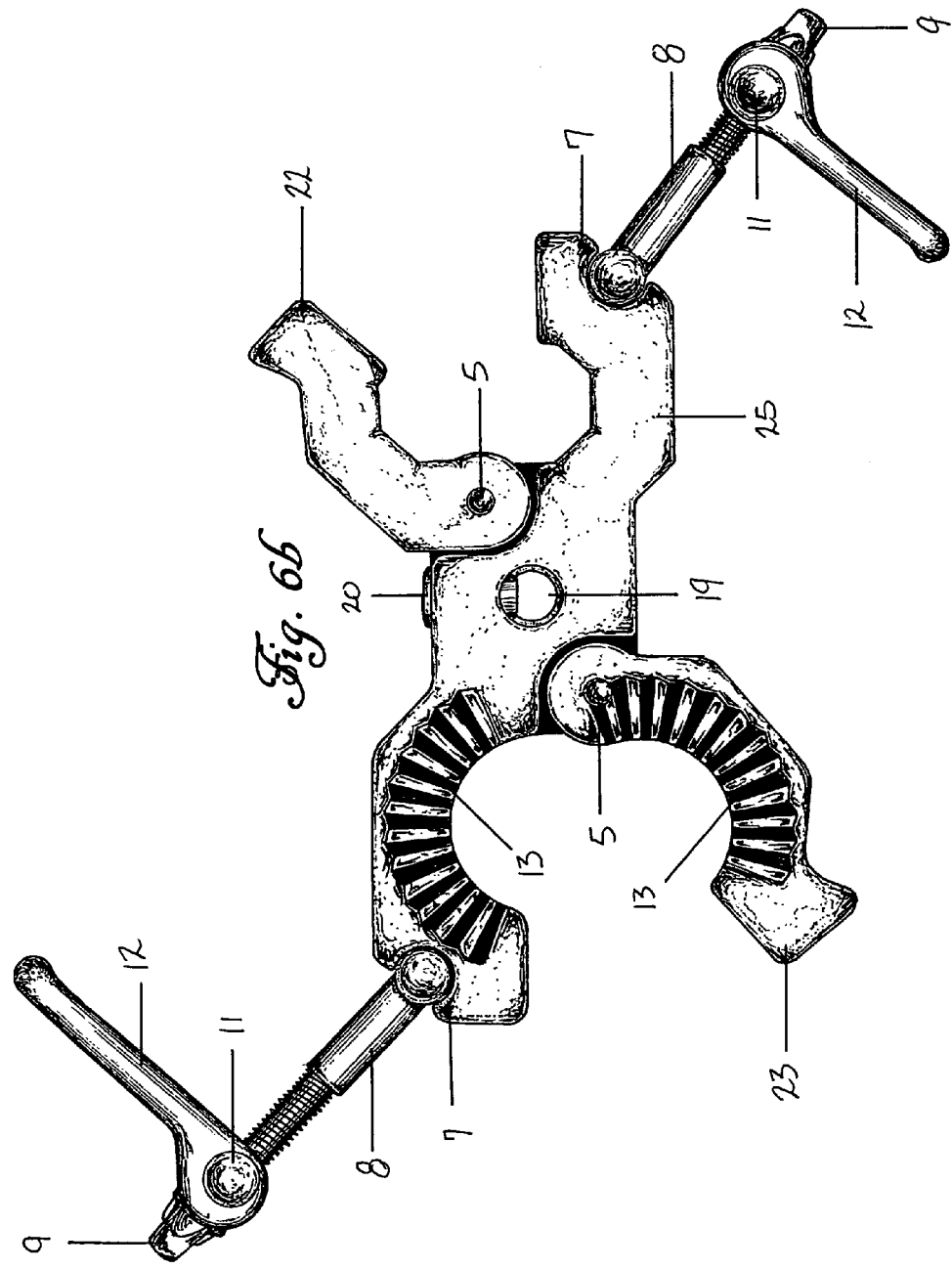

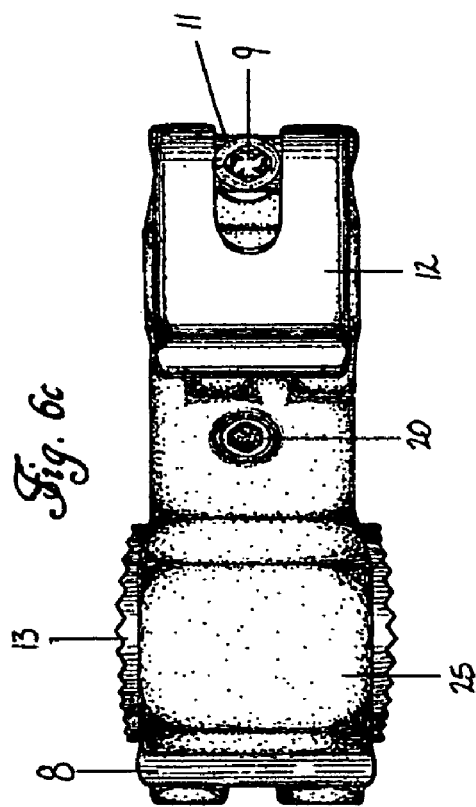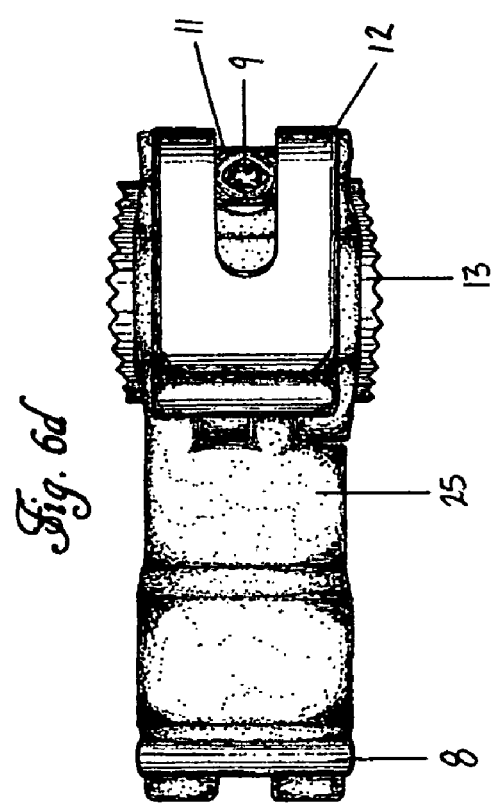

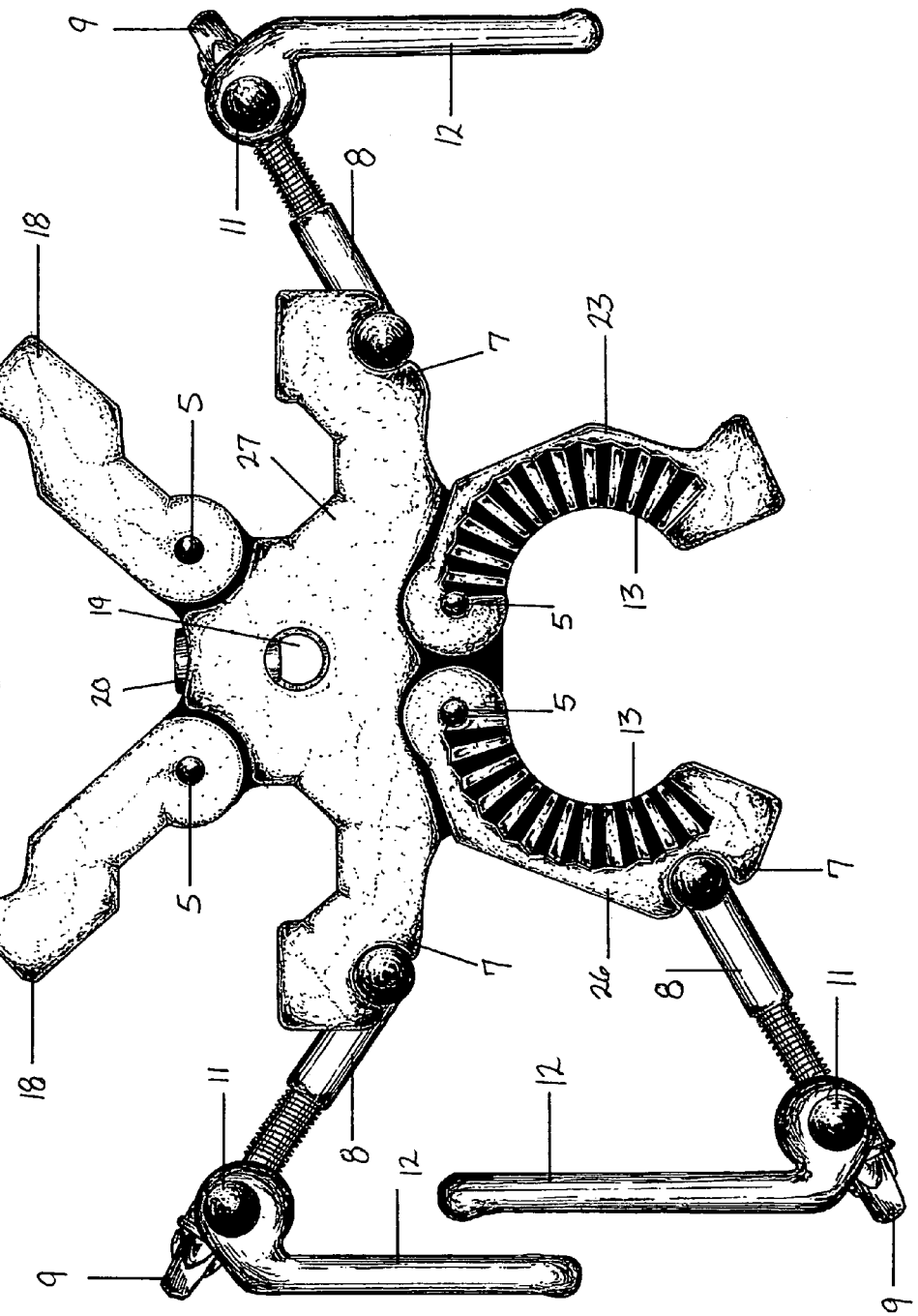

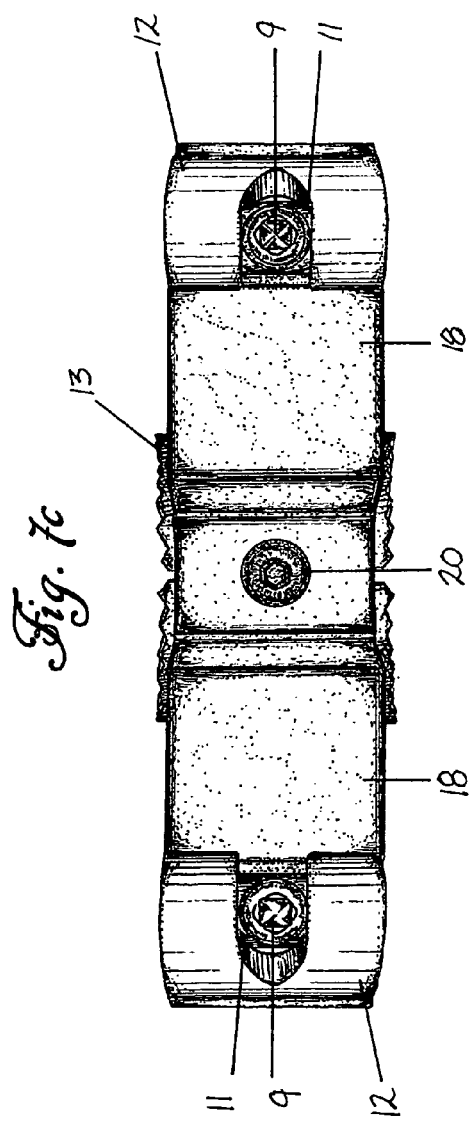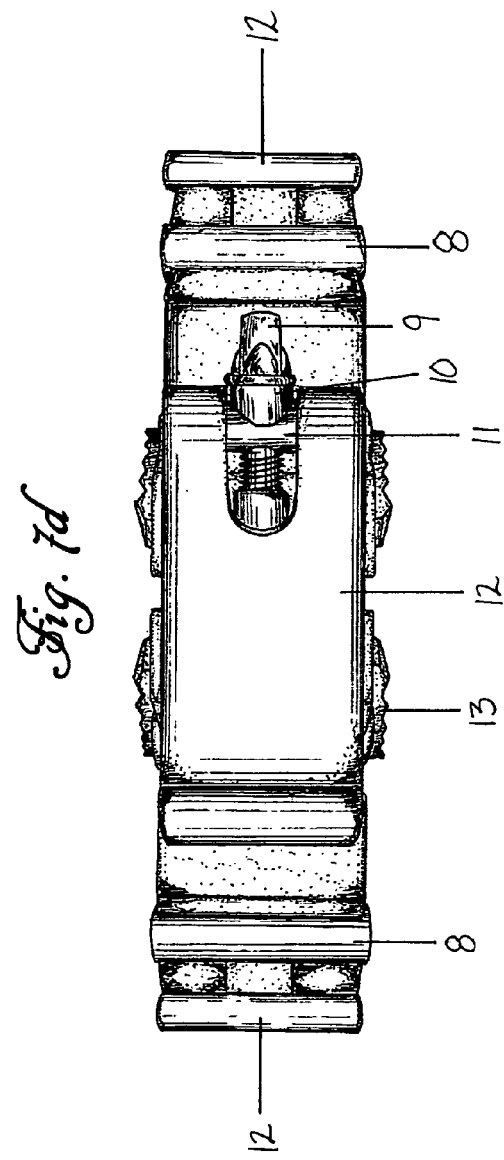

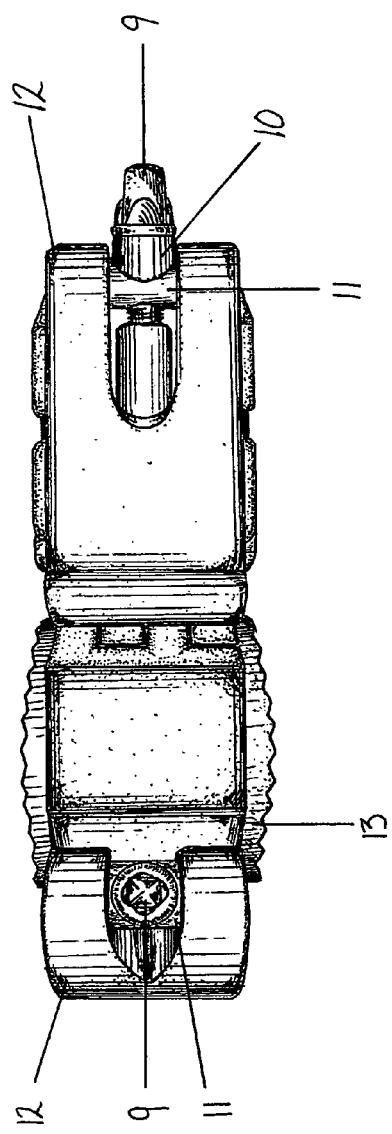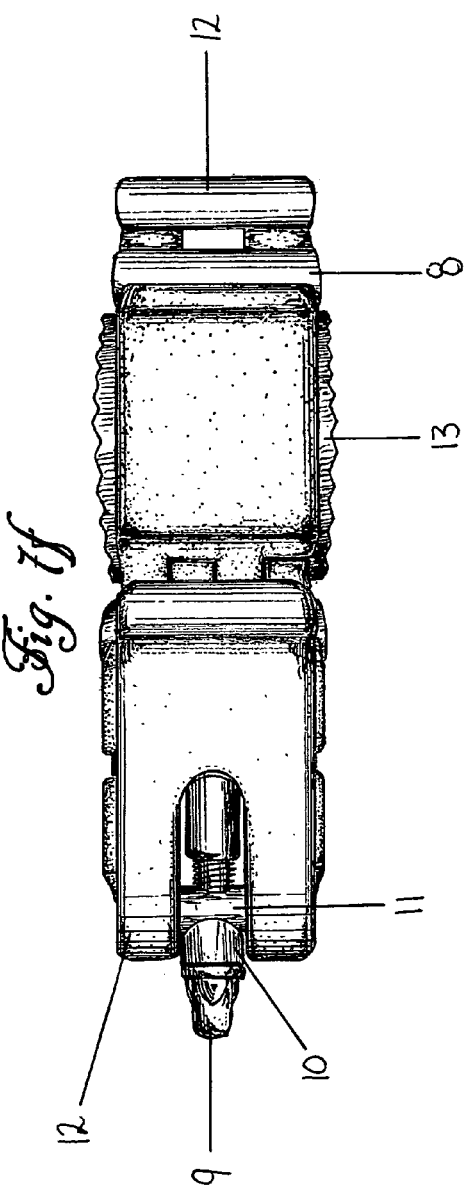

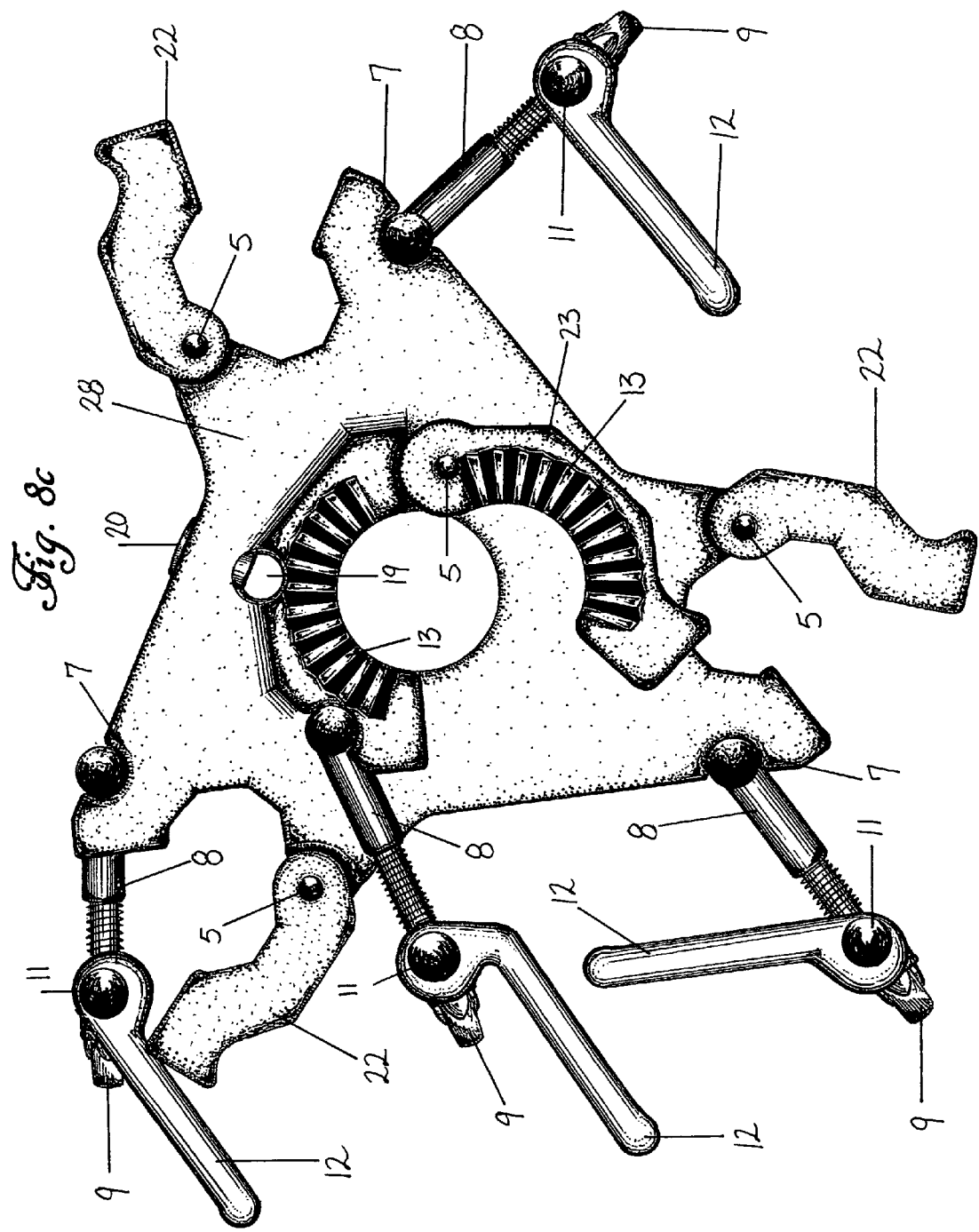

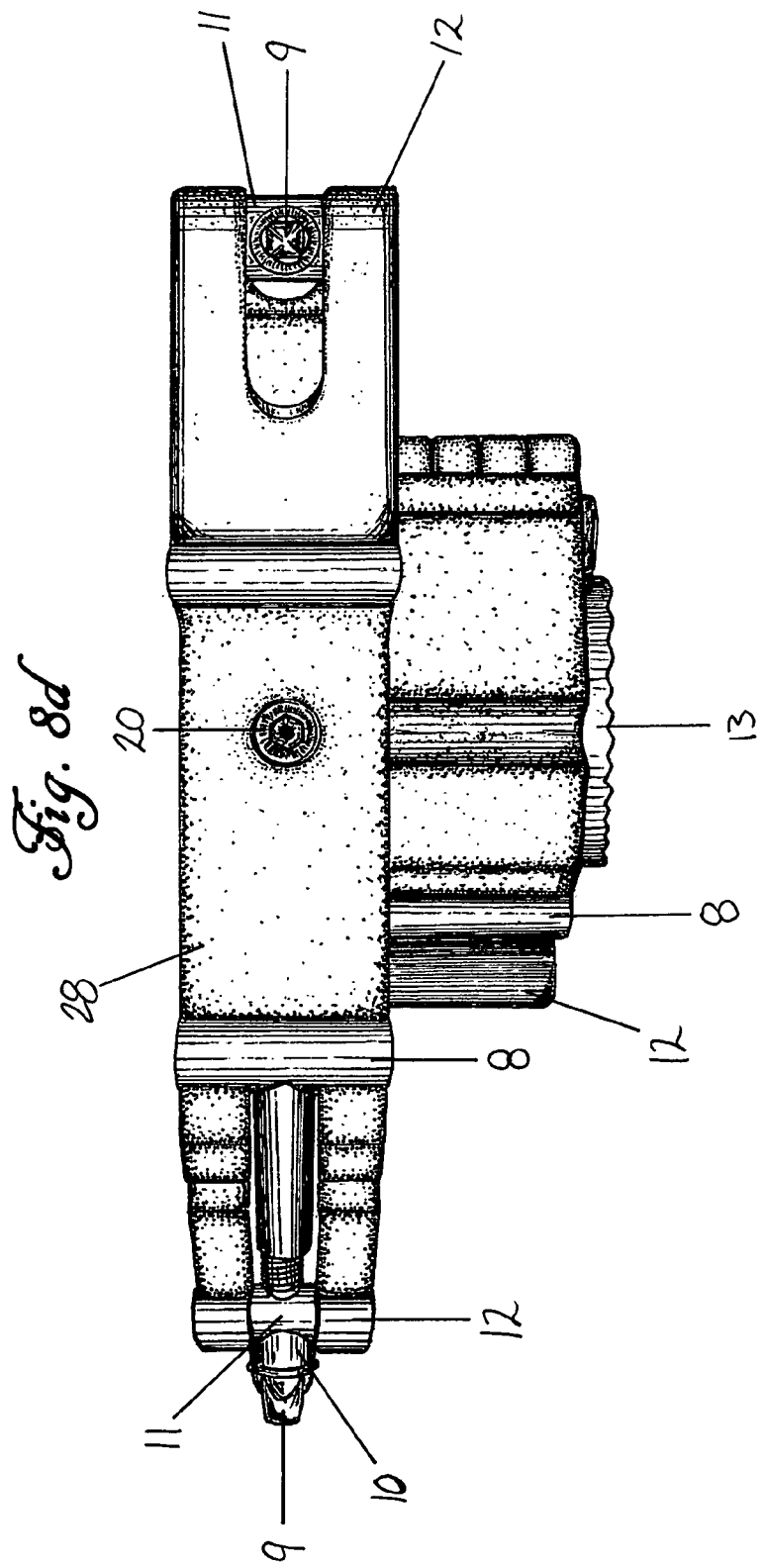

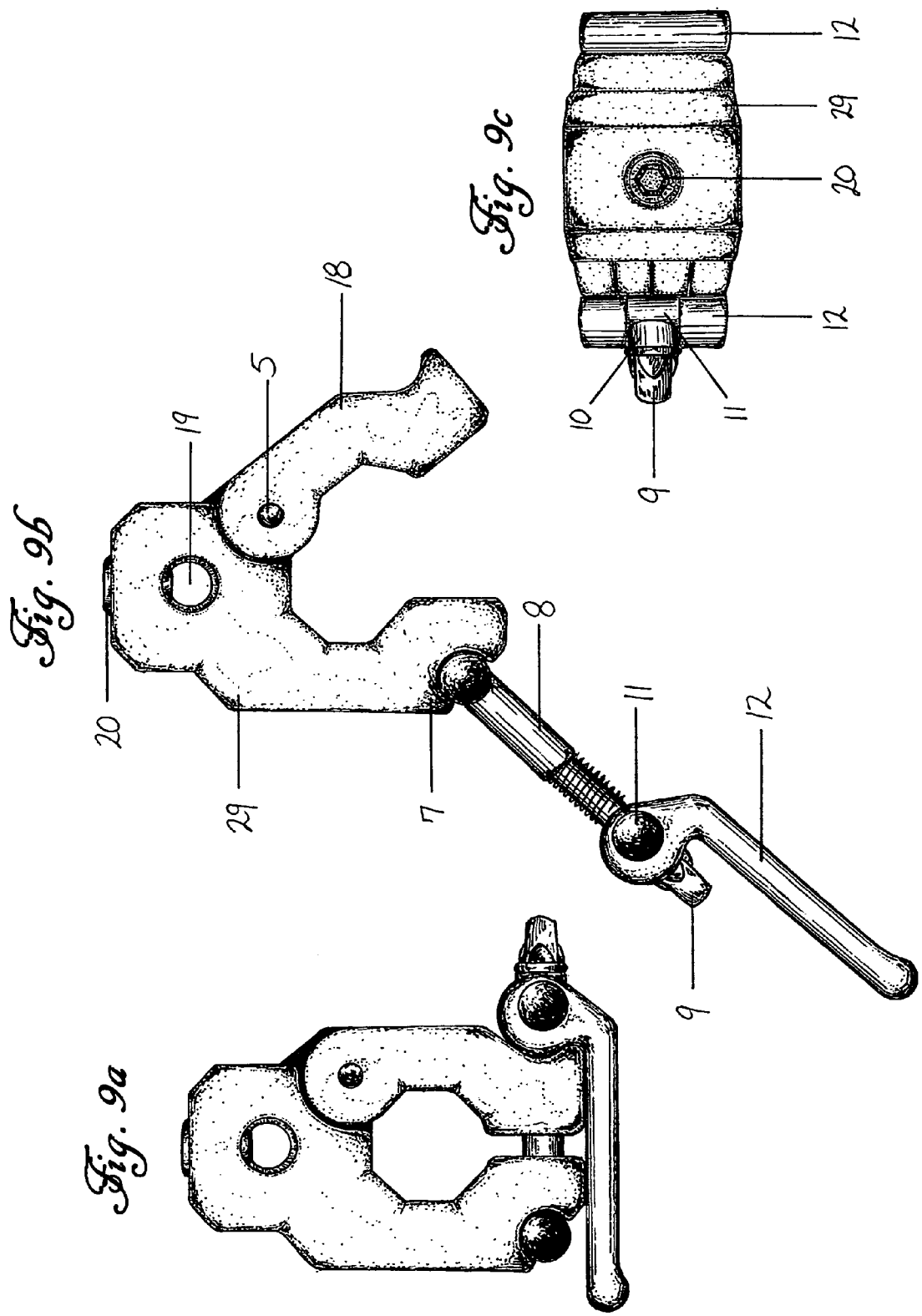

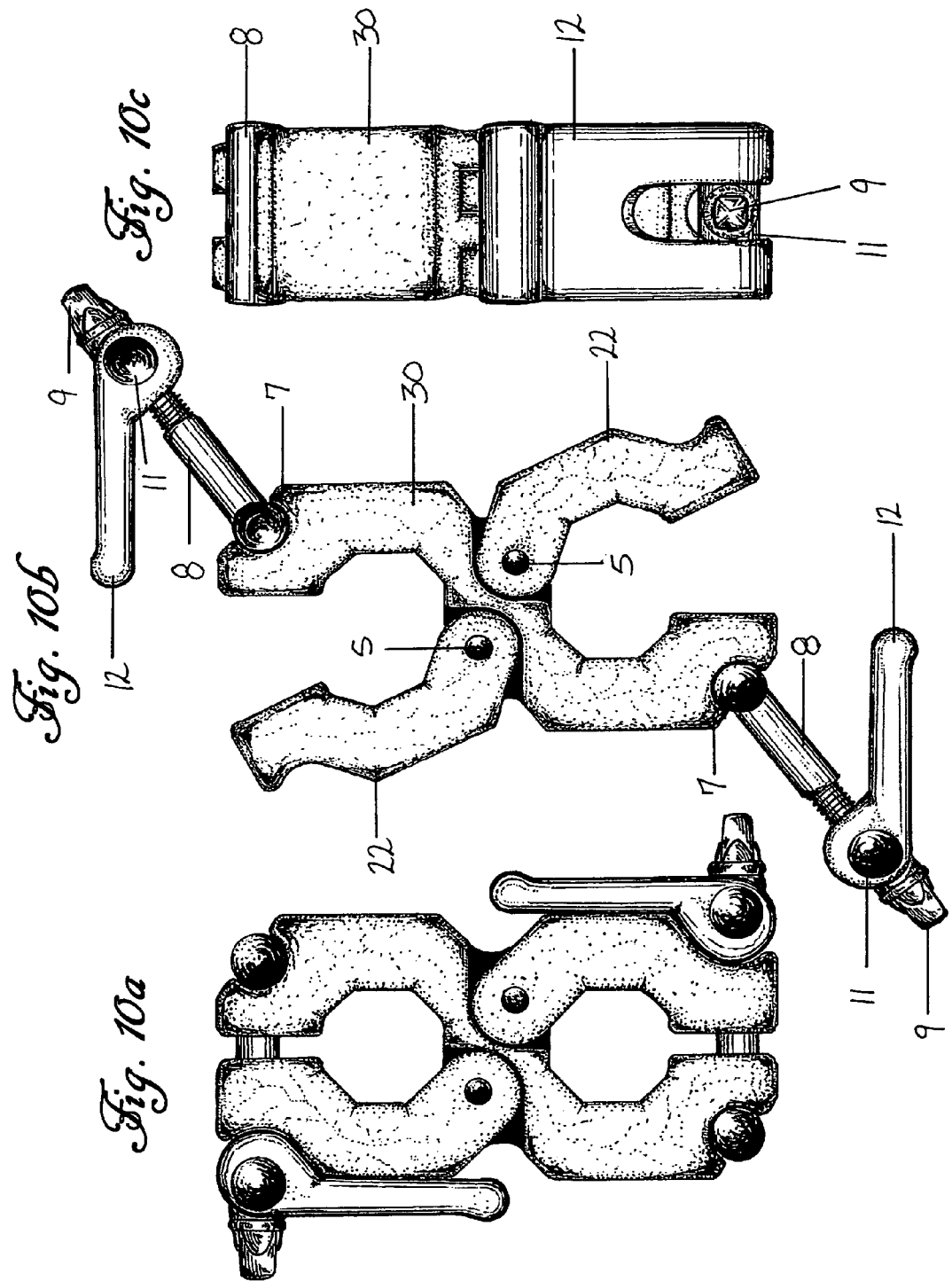

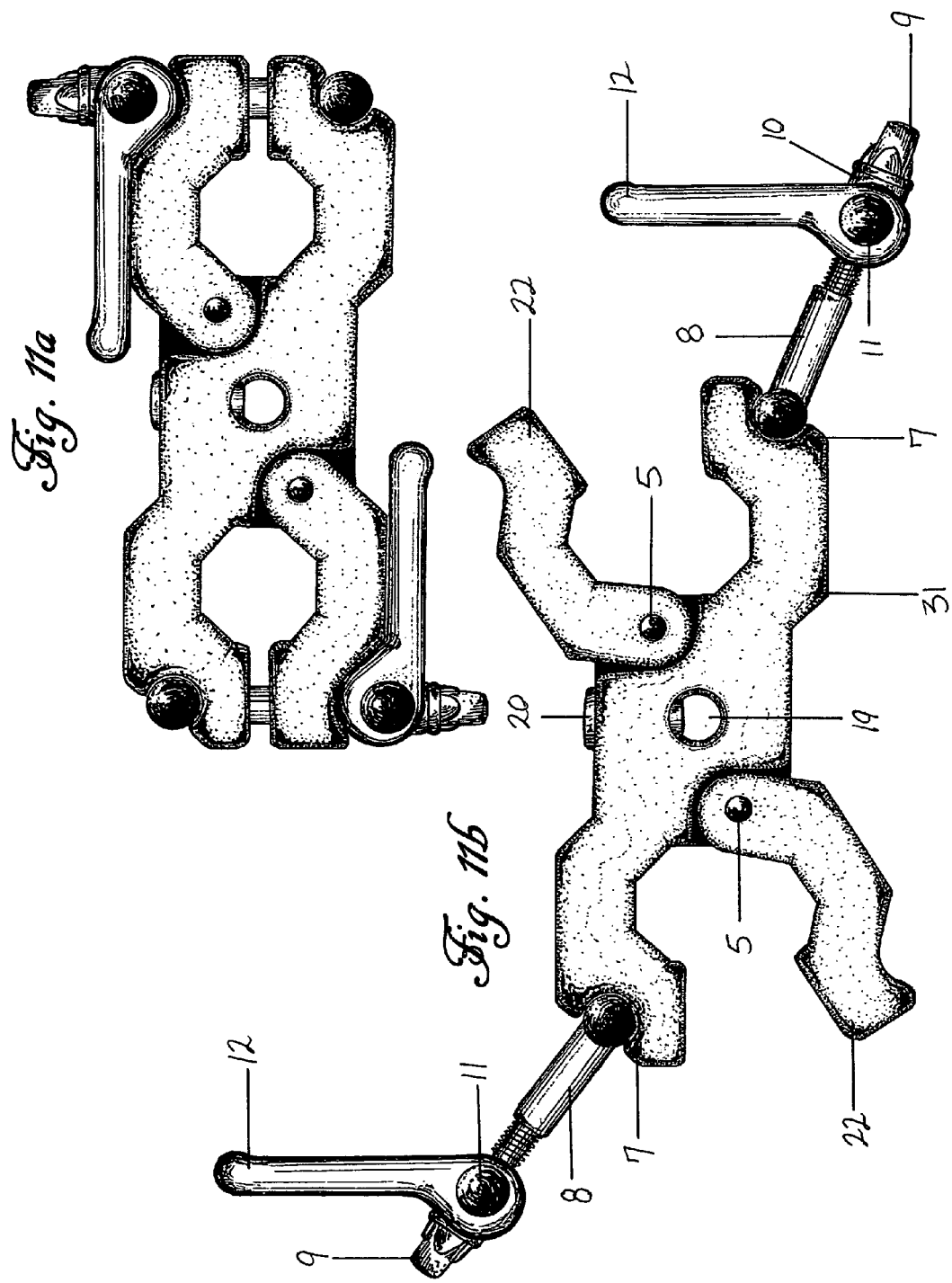

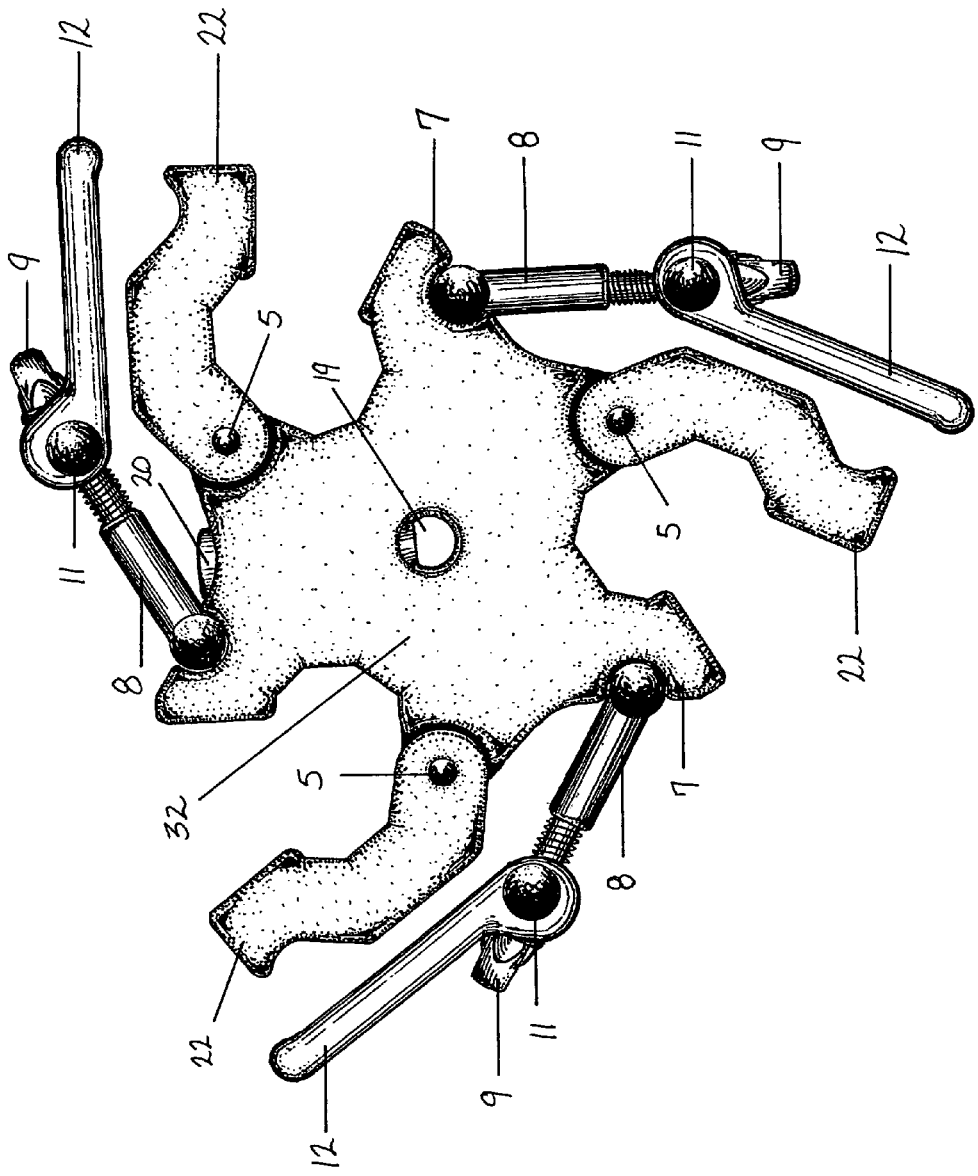

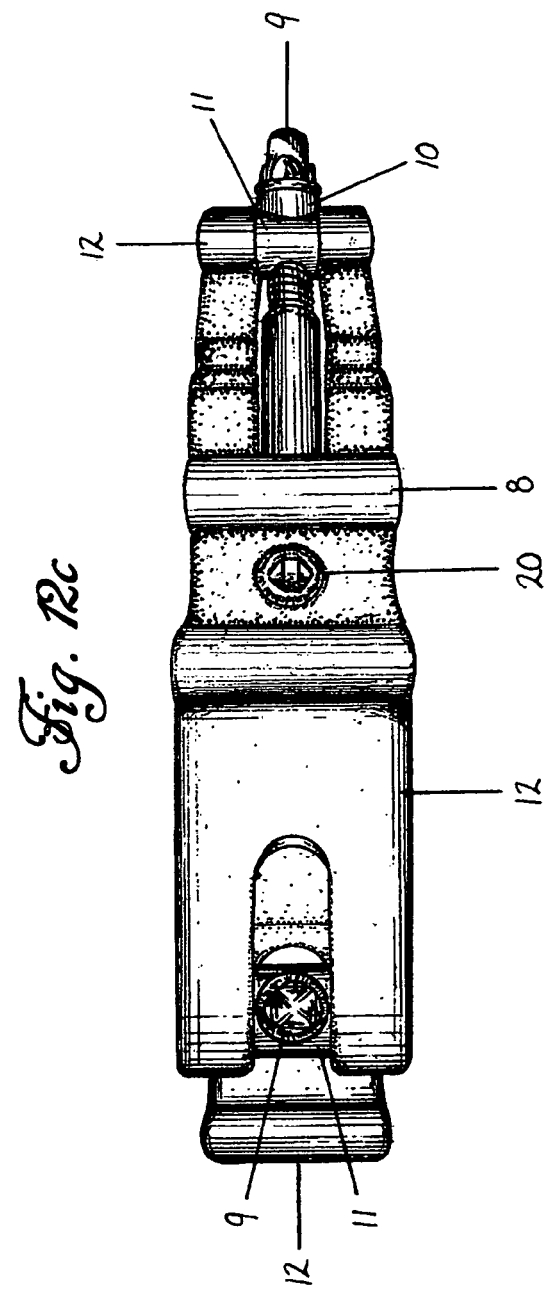

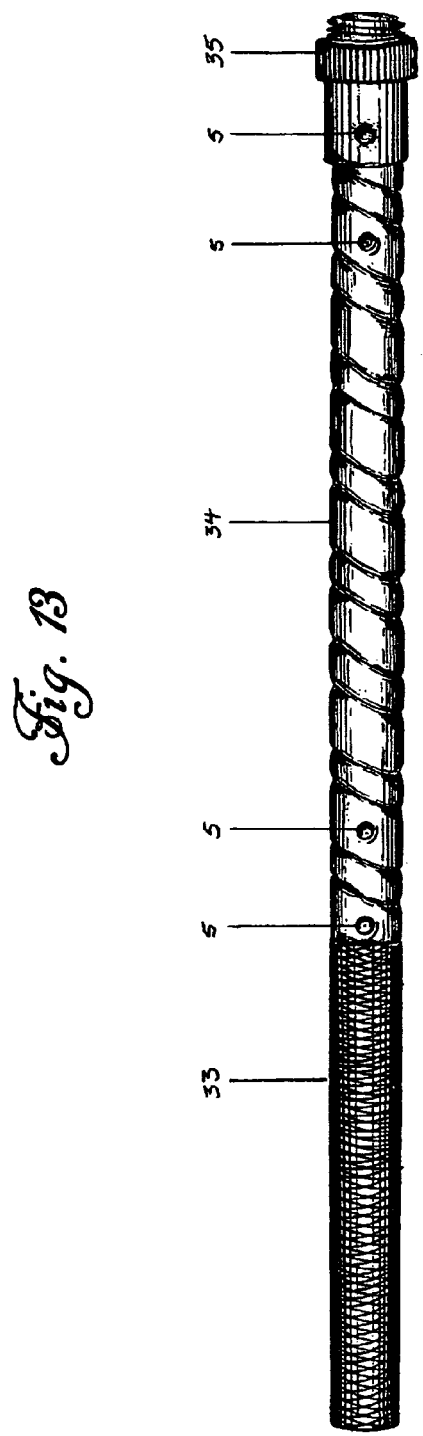

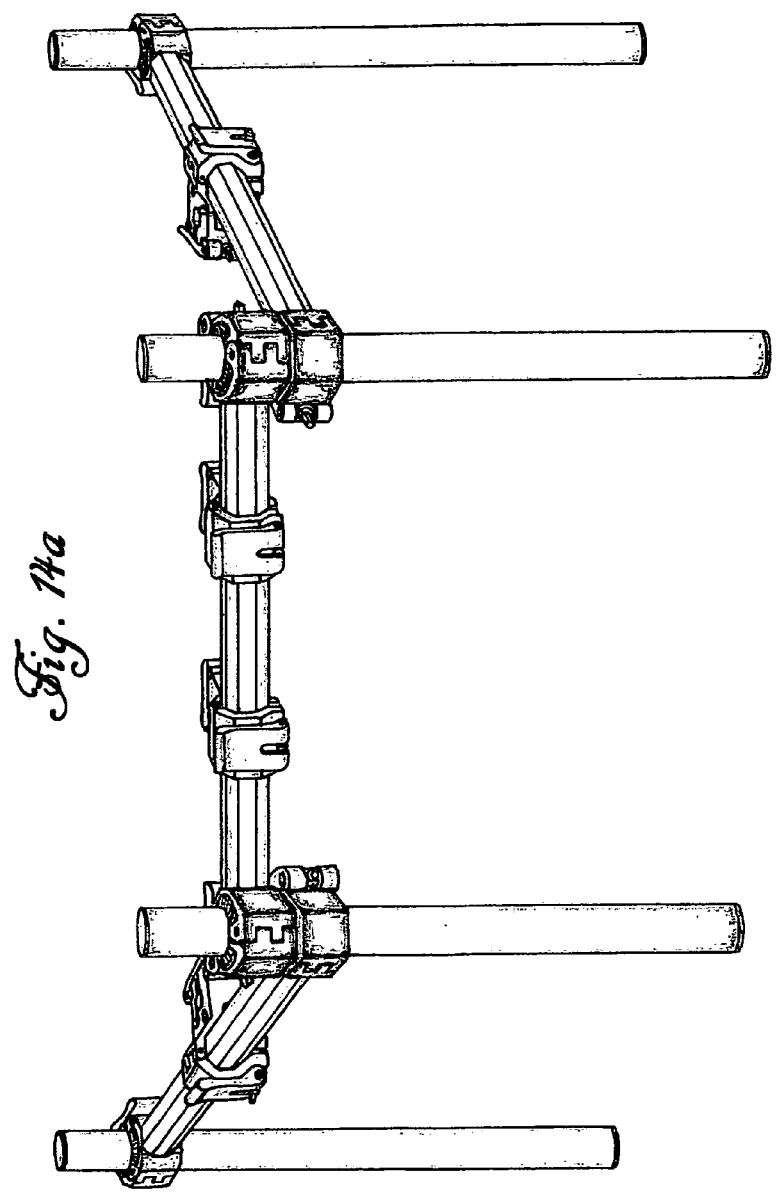

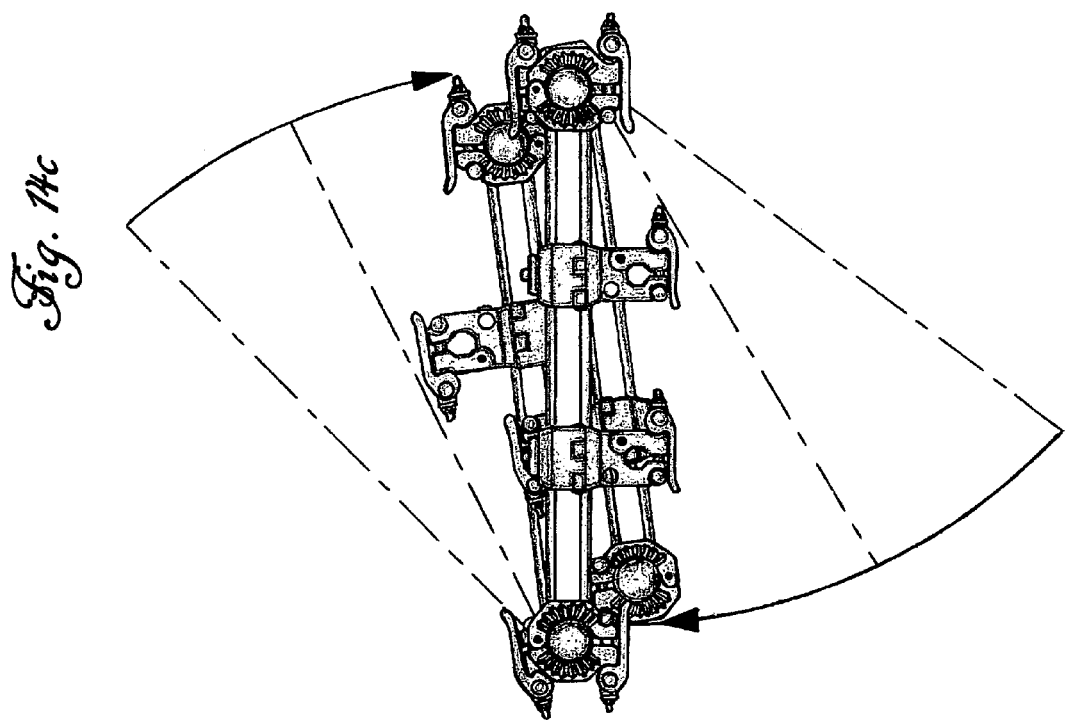

TRSERIES DRUM RACK SYSTEM-ACOUSTIC AND/OR ELECTRONIC DRUM MOUNTING RACK WITH EIGHT-SIDED PIPING AND INTERLOCKING CLAMPS

CROSS-REFERENCED TO RELATED APPLICATIONS

This application claims the benefit of provisional patent application Ser. No. 61/283,226, filed 2009 Dec. 1 by the inventor.

BACKGROUND

Prior Art

The following is a tabulation of some prior art that presently appears relevant:

| U.S. Patents | | | |
|---|---|---|---|
| Pat. No. | Kind Code | Issue Date | Patentee |
| 4,123,095 | — | 1978 Oct. 31 | Stehlin |
| 4,579,229 | — | 1986 Apr. 1 | Porcaro et al |
| 5,337,646 | — | 1994 Aug. 16 | Austin |
| 5,353,674 | — | 1994 Oct. 11 | Volpp |
| 5,520,292 | — | 1996 May 28 | Lombardi |
| 5,929,355 | — | 1998 Jan. 26 | Adinolf |
| 5,949,008 | — | 1999 Sept. 07 | Augsburger |
| 6,648,376 | B2 | 2003 Nov. 18 | Christianson |

Percussion instrument vendors supply music stores around the world with acoustic drums, electronic drums, cymbals, and hardware for the mounting of said percussion equipment. This equipment will be sold to drummers and percussionists alike and will be for personal use or for live playing situations. The equipment can be rather heavy and hard to carry around when assembled. Some companies have developed a system of interlocking pipes and clamps that drummers can use to overcome these tough tasks. This system is commonly referred to as a "drum rack." Percussionists would use these drum racks to consistently set up the equipment during performances, and the racks help maintain the comfortable "feel" one receives after setup. Drum racks are made using technology already known to manufacturers such as machine pressing, die-cast forming, and in some cases plastic injection molding processes.

Manufacturers carry their own style of drum rack and offer various clamps to accommodate user preferences. Many racks are made with round piping, some are made with square tubing, and others are made with hexagonal bars. Round piped racks are designed in a way that is cheap to manufacture but these round pipes have one major flaw. The racks are made with round piping and round clamps. When a drummer mounts a drum or cymbal that may be too heavy, the clamp may give way to gravity, and cause it to slip out of position. This widely discussed problem is referred to as "rack slippage." This is a problem for drummers because: 1) it may cause the equipment to slip out of position during performances resulting in an unrecognizable and uncomfortable "feel" in play, or 2) it may damage or scratch the equipment that is mounted. Another problem that can occur is "rack resonance." This problem happens when sound resonates through the piping; causing a ringing noise.

One style of rack proposed in the U.S. Pat. No. 4,579,229 to Porcaro (1986) eliminates the problem of rack slippage by offering square tubing. However, this specific design is not height adjustable to the user. Not all drummers are the same height; therefore, this rack design may not work for everyone. Another rack developed is U.S. Pat. No. 5,337,646 to Austin (1994). This rack also eliminates rack slippage by running two tubes parallel to the floor and in an ergonomic fashion to the user. It creates a locking clamp but uses the bass drum to support the weight of the rack and everything that is mounted. This is a problem because it will add unnecessary stress to the drum which could be damaged. This design is not easily adaptable to future add-ons, nor will it fold up for easy transportation; and may take some time to set up and tear down. The same could be said for U.S. Pat. No. 5,949,008 to Augsburger (1999). This rack design may also add unwanted stress to the drum. In conclusion: a drum rack needs to eliminate rack slippage, reduce rack resonance, have height adjustability, fold and set up with ease, and allow future add-ons.

SUMMARY

In accordance with one embodiment, all drummers and percussionists can use my drum rack with common issues solved, along with some added benefits. My design will provide stability for the equipment without using a drum as a means of support.

ADVANTAGES

I have invented a new drum rack. My design uses the same pipe and clamp technology so that any drummer can use it. It is foldable, clean in design, quick to set-up and easy to tear down. The horizontal piping is eight-sided to create a locking base that will aide in preventing rack slippage. The piping will be insulated in order to avoid rack resonance. The clamps are made using plastic to help prevent scratching, and they have easy locking levers that are fully removable when in need of service. This will aid in quick setups. Some clamps feature a "raised-geared teeth" design on the top and bottom face for other clamps to interlock at various and precise angles. Some clamps even offer more than one percussion arm support; so fewer clamps will be needed in setup. All of these units are fully adjustable with any standard drum key.

DRAWINGS

Figures

FIG. 1a—shows an aerial view of the horizontal drum rack piping with the clamps in a closed position.

FIG. 1b—shows a bottom view with the horizontal drum rack piping and a clamp half in an open position.

FIG. 1c—shows a bottom view with the clamp removed from the piping in an open position.

FIG. 1d—shows a side and cross-section of the horizontal drum rack piping with the insulation on the inside.

Figure 1E:
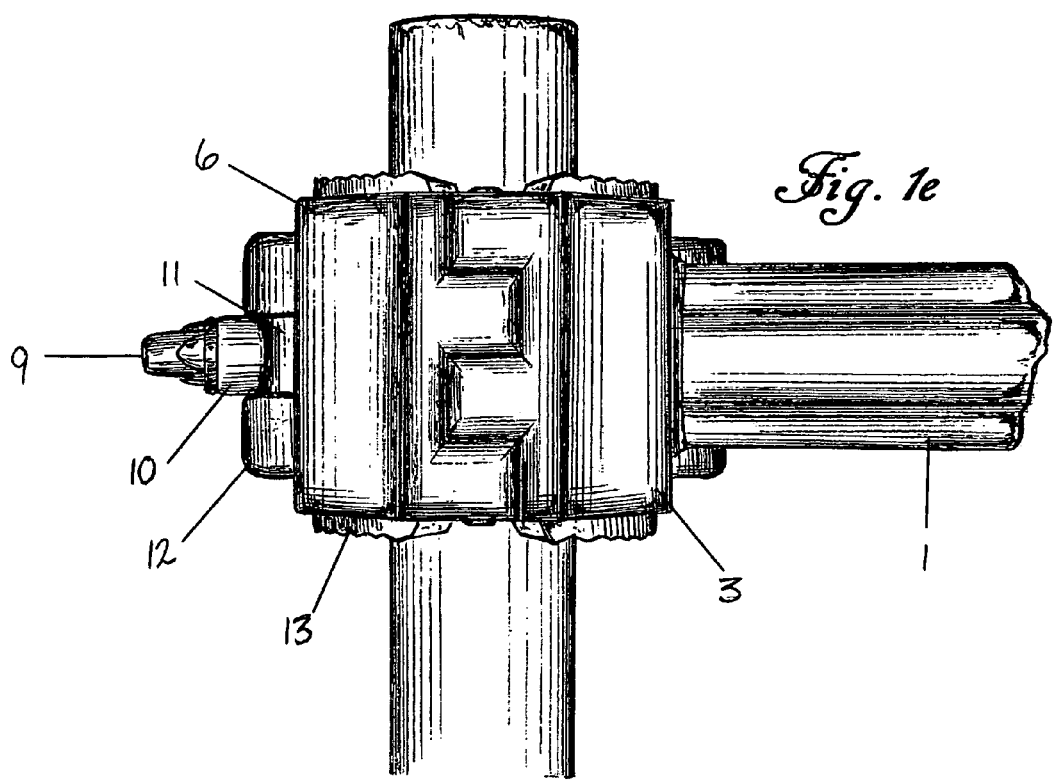

FIG. 1e—shows a front view of the hinge on the horizontal drum rack piping attached to a leg.

Figure 1F:
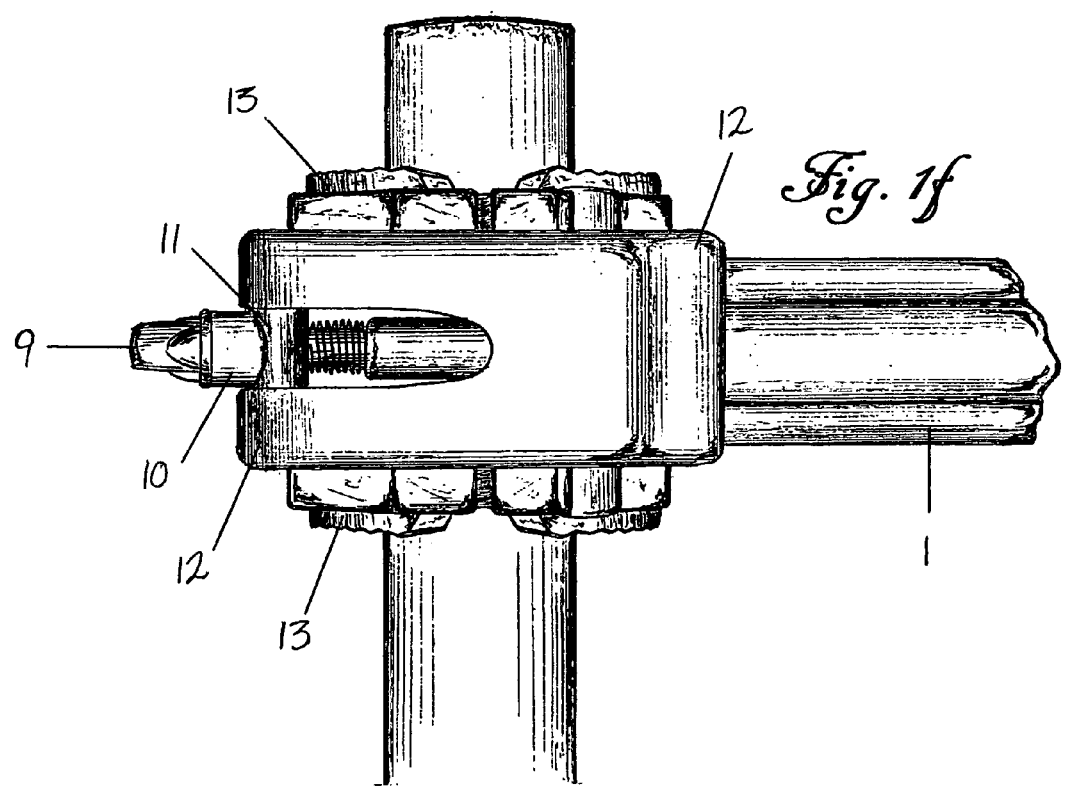

FIG. 1f—shows a back view of the easy locking lever and horizontal drum rack piping attached to a leg.

FIG. 1g—shows an exploded view of the easy lever locking assembly.

FIG. 2a—shows an aerial view of the round memory clamp in a closed position.

FIG. 2b—shows an aerial view of the round memory clamp in an open position.

FIG. 2c—shows a back view of the round memory clamp in a closed position.

FIG. 2d—shows a front view of the hinge on the round memory clamp in a closed position.

Figure 3A:
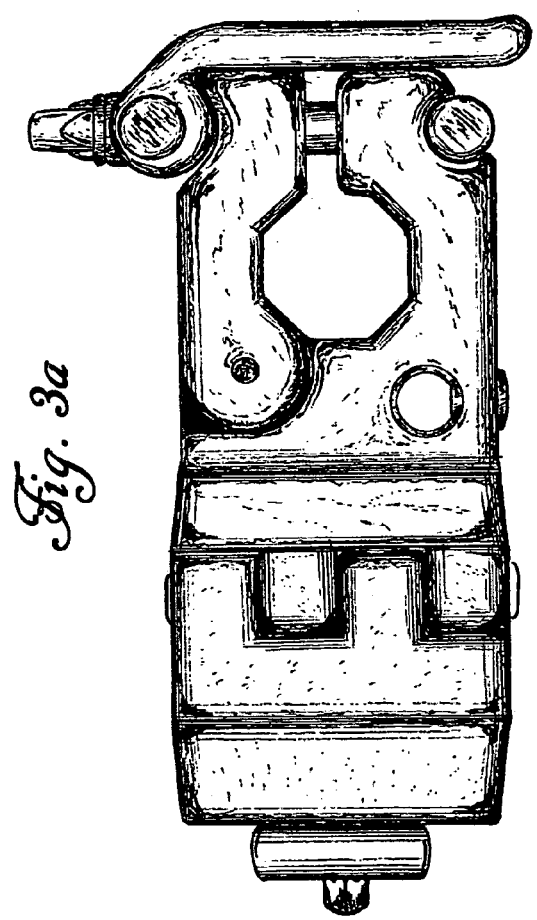

FIG. 3a—shows an aerial view of the rack-arm clamp with an adapter hole and in a closed position.

FIG. 3b—shows an aerial view of the rack-arm clamp with an adapter hole and in an open position.

Figure 3C:
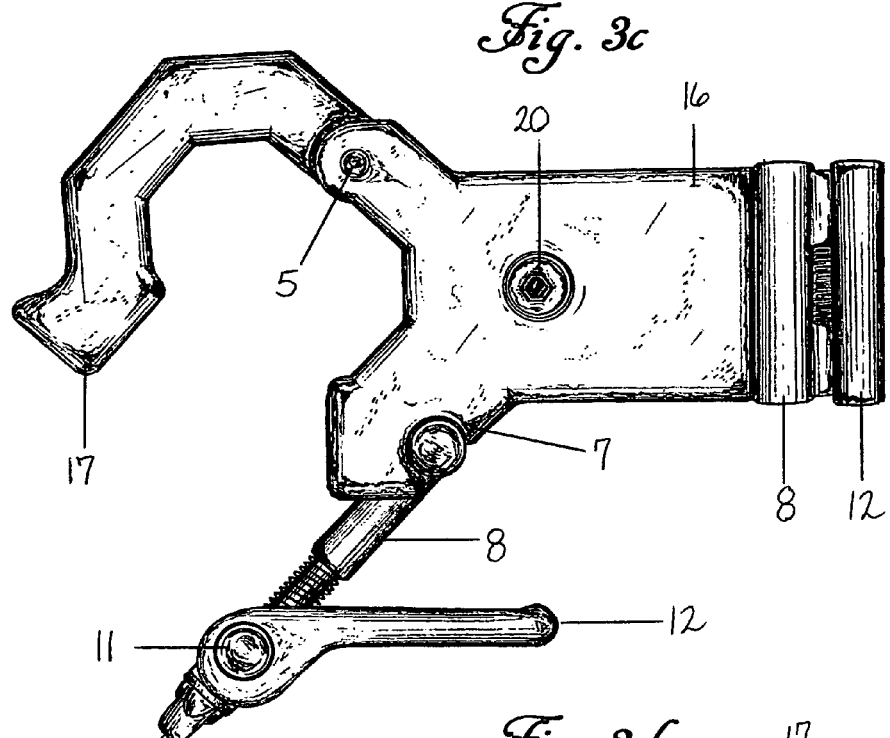

FIG. 3c—shows a right side view of the rack-arm clamp with an adapter hole and in open position.

Figure 3D:
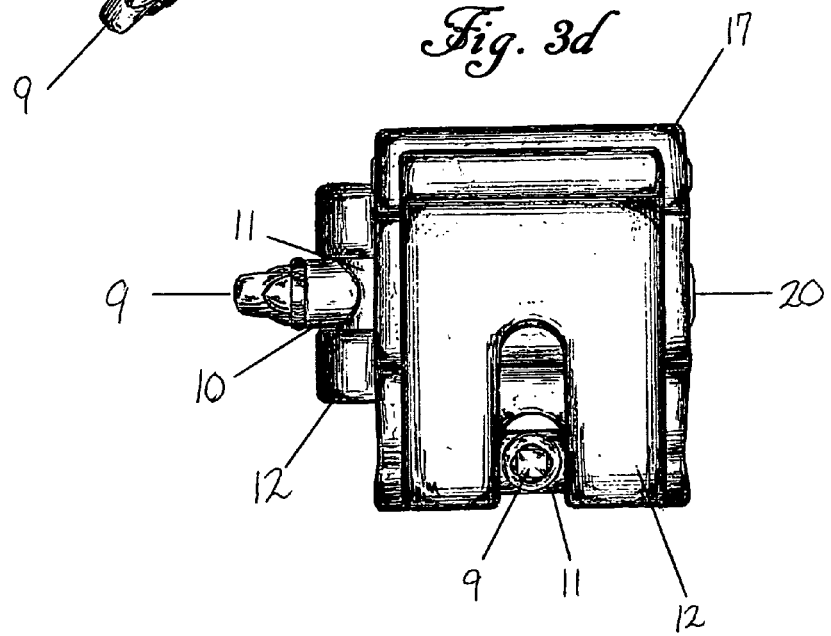

FIG. 3d—shows a back view of the rack-arm clamp with an adapter hole and in a closed position.

FIG. 3e—shows a left side view of the rack-arm clamp with an adapter hole and in a closed position.

FIG. 3f—shows a bottom view of the rack-arm clamp with an adapter hole and in a closed position.

Figure 4A:
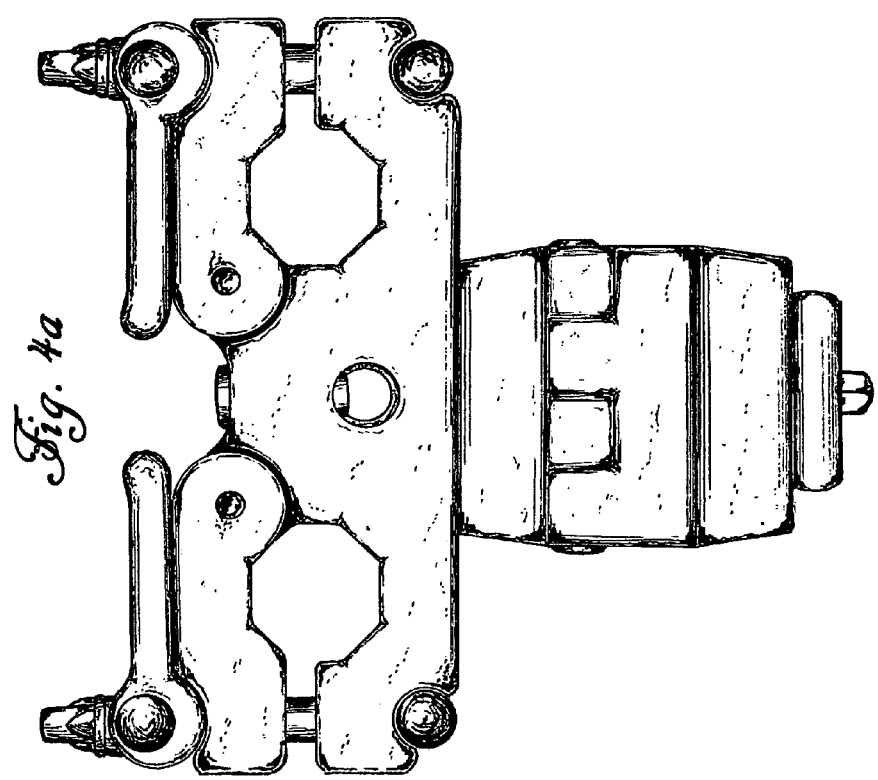

FIG. 4a—shows an aerial view of the rack-double arm clamp with an adapter hole and in a closed position.

FIG. 4b—shows an aerial view of the rack-double arm clamp with an adapter hole and in an open position.

FIG. 4c—shows a side view of the rack-double arm clamp with an adapter hole and in a closed position.

FIG. 4d—shows a back view of the rack-double arm clamp with an adapter hole and in a closed position.

Figure 5A:
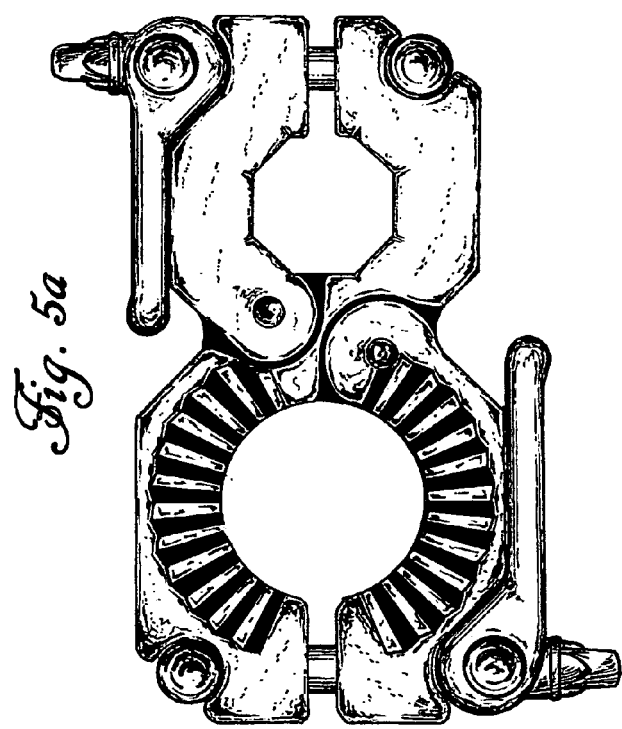

FIG. 5a—shows an aerial view of the leg-arm clamp in a closed position.

FIG. 5b—shows an aerial view of the leg-arm clamp in an open position.

FIG. 5c—shows the right side view of the leg-arm clamp in a closed position.

FIG. 5d—shows the front side view of the leg-arm clamp in a closed position.

FIG. 5e—shows the back side view of the leg-arm clamp in a closed position.

FIG. 5f—shows the left side view of the leg-arm clamp in a closed position.

Figure 6A:
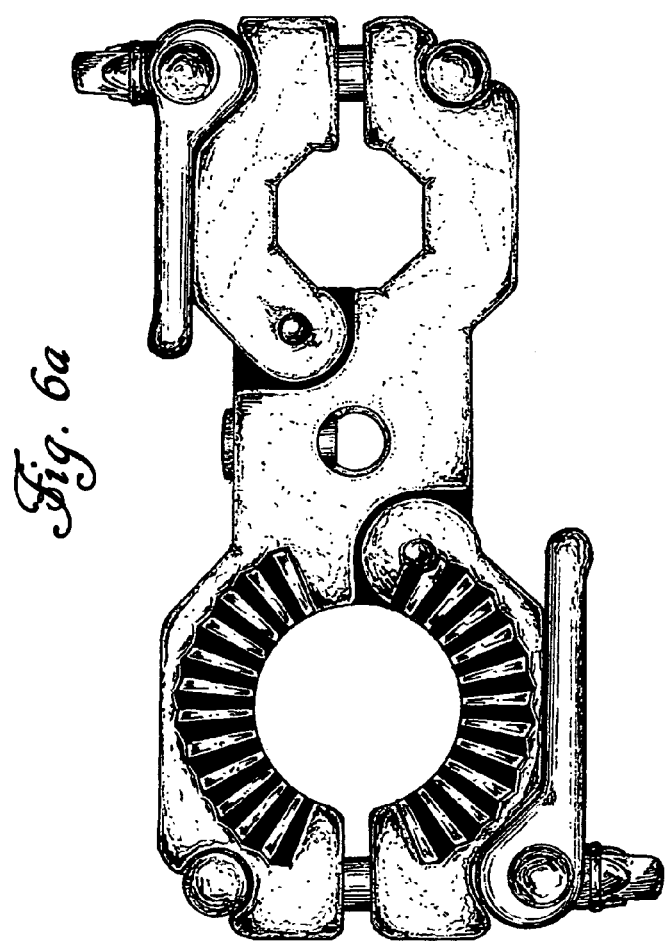

FIG. 6a—shows an aerial view of the leg-arm clamp with an adapter hole and in a closed position.

FIG. 6b—shows an aerial view of the leg-arm clamp with an adapter hole and in an open position.

FIG. 6c—shows a left side view of the leg-arm clamp with an adapter hole and in a closed position.

FIG. 6d—shows a right side view of the leg-arm clamp with an adapter hole and in a closed position.

Figure 7A:
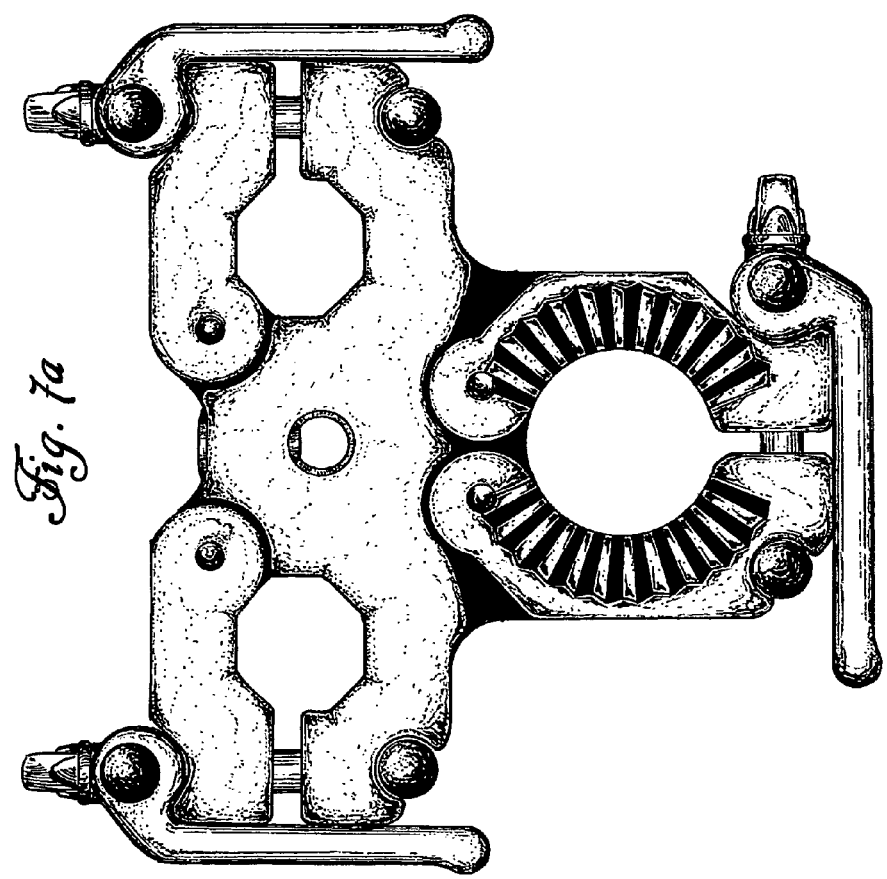

FIG. 7a—shows an aerial view of the leg-double arm clamp with an adapter hole and in closed position.

FIG. 7b—shows an aerial view of the leg-double arm clamp with an adapter hole and in open position.

FIG. 7c—shows a back view of the rack-double arm clamp with an adapter hole and in closed position.

FIG. 7d—shows a front view of the rack-double arm clamp with an adapter hole and in closed position.

FIG. 7e—shows a left side view of the rack-double arm clamp with an adapter hole and in closed position.

FIG. 7f—shows a right side view of the rack-double arm clamp with an adapter hole and in closed position.

Figure 8A:
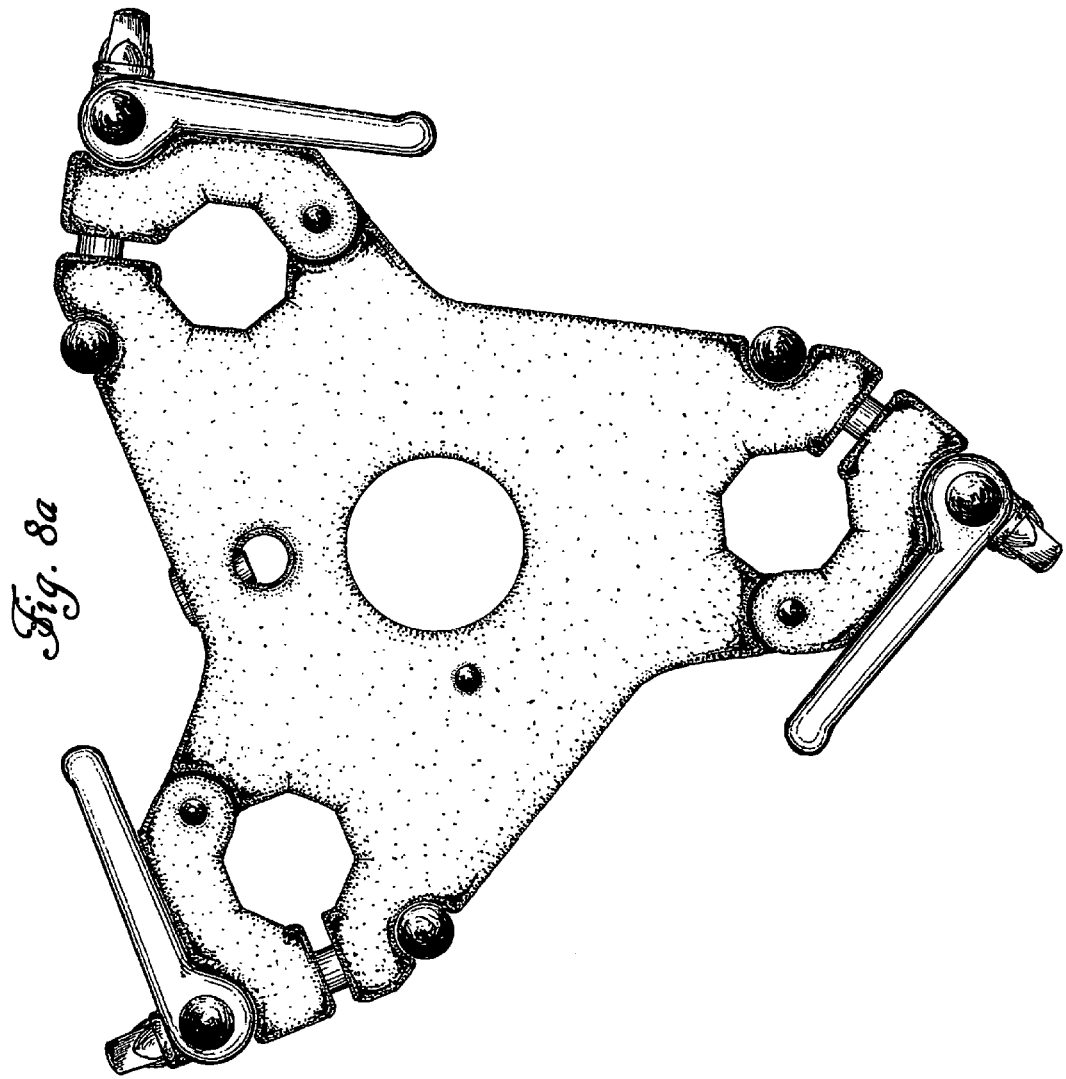
Figure 86:
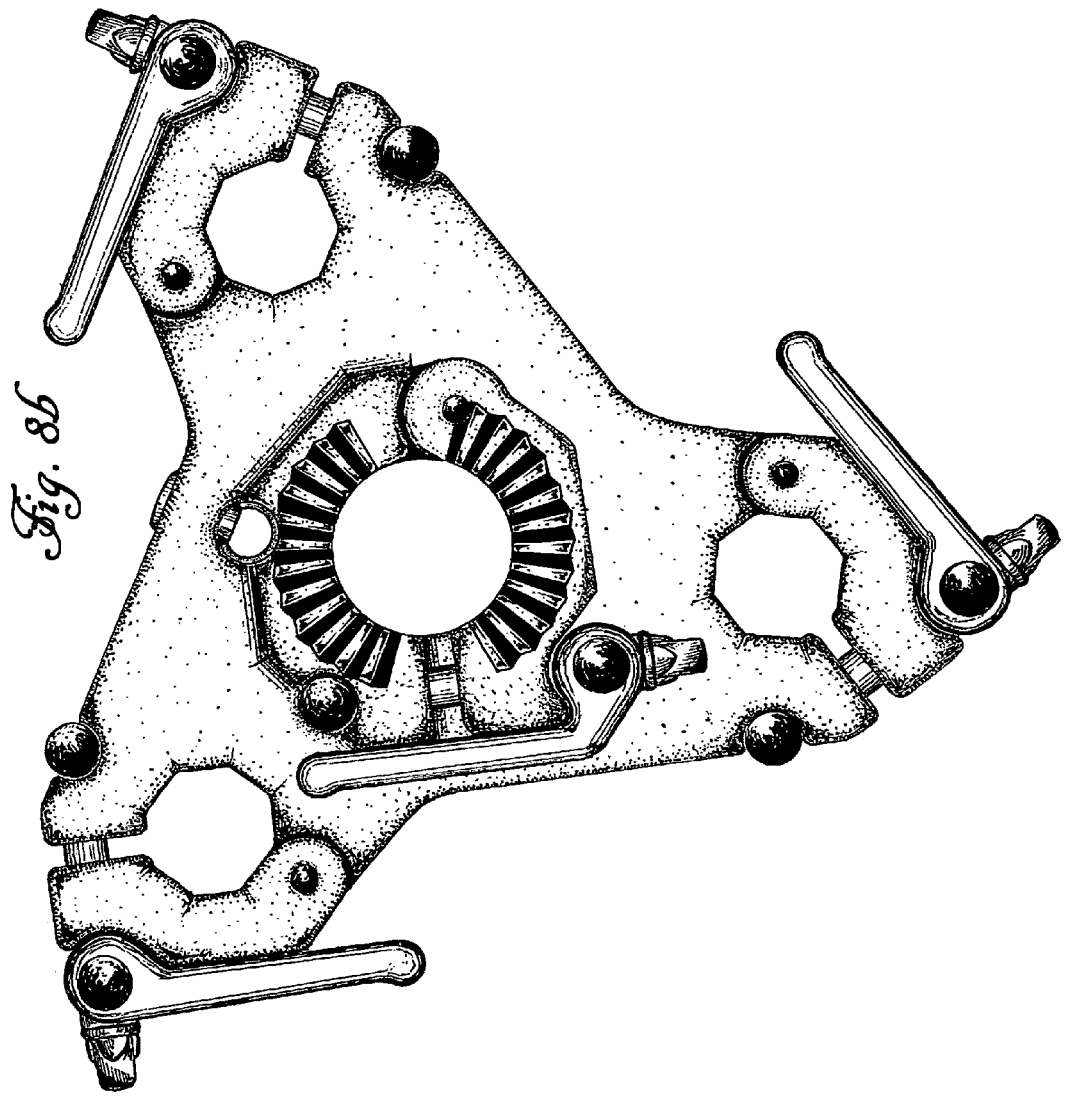

FIG. 8a—shows an aerial view of the leg-triple arm clamp with an adapter hole and in a closed position.

FIG. 8b—shows a bottom view of the leg-triple arm clamp with an adapter hole and in a closed position.

FIG. 8c—shows a bottom view of the leg-triple arm clamp with an adapter hole and in an open position.

FIG. 8d—shows a side view of the leg-triple arm clamp with an adapter hole and in a closed position.

FIG. 9a—shows an aerial view of the arm-adapter clamp in a closed position.

FIG. 9b—shows an aerial view of the arm-adapter clamp in an open position.

FIG. 9c—shows a side view of the arm-adapter clamp in a closed position.

FIG. 10a—shows an aerial view of the arm-arm clamp in a closed position.

FIG. 10b—shows an aerial view of the arm-arm clamp in an open position.

FIG. 10c—shows a side view of the arm-arm clamp in a closed position.

FIG. 11a—shows an aerial view of the arm-arm clamp with an adapter hole in a closed position.

FIG. 11b—shows an aerial view of the arm-arm clamp with an adapter hole in an open position.

Figure 12A:
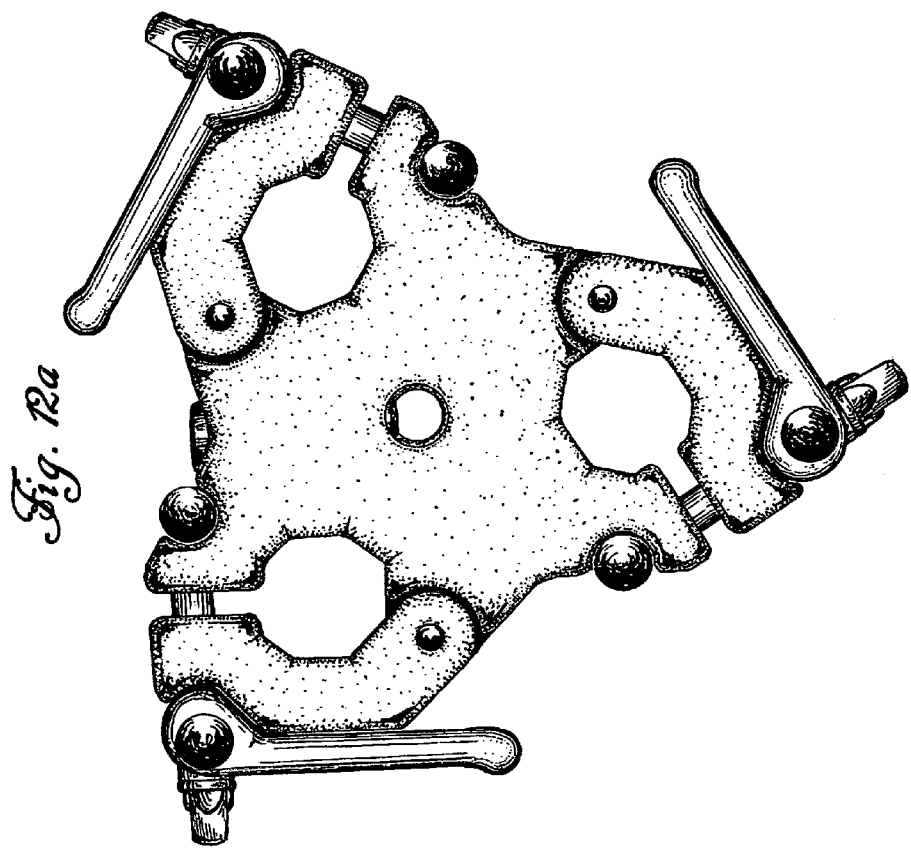

FIG. 12a—shows an aerial view of the arm-double arm clamp with an adapter hole and in a closed position.

FIG. 12b—shows an aerial view of the arm-double arm clamp with an adapter hole and in an open position.

FIG. 12c—shows a side view of the arm-double arm clamp with an adapter hole and in a closed position.

FIG. 13—shows a drum microphone mount that will fit into the adapter holes of the clamps.

FIG. 14a—shows the drum rack system with four vertical legs, three horizontal rack bars, and four mounting clamps.

Figure 14B:
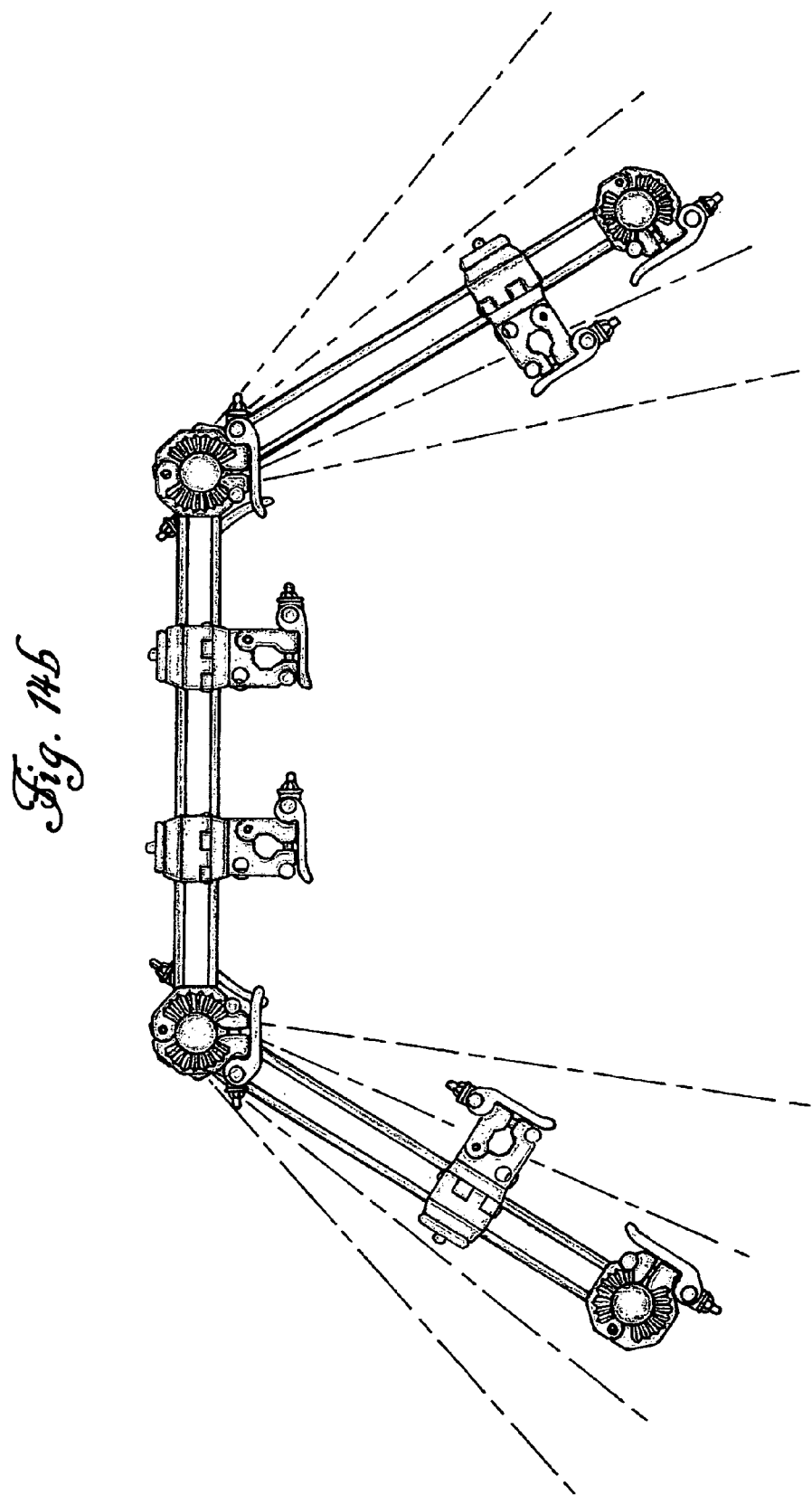

FIG. 14b—shows an aerial view of the drum rack system with four legs and three main bars.

FIG. 14c—shows an aerial view of the drum rack system folded up for easy storage or during transport.

DRAWINGS

Reference Numerals

1. Piping
2. Foam
3. TR-80 clamp body
4. Screw
5. Pin
6. TR-80 clamp arm
7. T-nut housing
8. T-nut
9. Tension rod
10. Concave washer
11. Cylinder
12. Easy locking lever
13. Raised-geared teeth
14. RMC clamp arm
15. RMC clamp body
16. RAC-38 clamp body
17. Octagonal clamp arm
18. Clamp arm-A
19. Perpendicular hole
20. Allen screw
21. RAC2-38 clamp body
22. Clamp arm-B
23. Leg clamp arm
24. LAC clamp body
25. LAC-38 clamp body
26. LAC2-38 clamp arm
27. LAC2-38 clamp body
28. LAC3-38 clamp body
29. A-38 clamp body
30. AAC clamp body
31. AAC-38 clamp body
32. AAC2-38 clamp body
33. Knurled rod
34. Gooseneck assembly section
35. Microphone mount screw

DETAILED DESCRIPTIONS

FIG. 1 shows an aerial view of the horizontal piping 1 with a clamp on either end in a closed position. These clamps will attach vertically to a round tube that will act as a means of support. The piping 1 is octagonal and is insulated with foam 2, as shown in FIG. 4. The piping 1 is connected to the plastic TR-80 clamp body 3; which is octagonal as well, fits snugly inside and is secured with a small screw 4 through the bottom of the piping 1 and into the TR-80 clamp body 3, as shown in FIG. 2 and FIG. 3. This screw will set flush to the surface of the piping as not to interfere with clamps mounted to the rack. The plastic TR-80 clamp body 3 is hinged to the plastic TR-80 clamp arm 6 with a metal pin 5, as shown in FIG. 3 and FIG. 5. There are three pivot points on this half of the assembly. This becomes 1 of 3. The metal t-nut 8 fits into the t-nut housing 7 on the plastic TR-80 clamp body 3, FIG. 2. This is pivot point 2 of 3. This is designed so the user can replace hardware that has become damaged. A tension rod 9 is inserted into a concave washer 10 and a cylinder 11 with a hole is inserted into an easy locking lever 12. The easy locking lever 12 is "U"-shaped so it will allow a tension rod 9 to pass through. This is pivot point 3 of 3. The tension rod 9 and concave washer 10 are then inserted into the hole in the cylinder 11 and screwed into the t-nut 8 as shown in FIG. 7. The same process will go for the opposite end of the piping assembly and will be ready to use. The piping 1 can be made in a variety of lengths to accommodate user preference.

Operation

The entire section of assembled piping, FIG. 1, will overlap horizontally with another section of assembled piping, FIG. 1, and will interlock at various and precise angles. This is accomplished through the clamp having a raised-geared teeth design on the top and bottom of the clamp face, FIGS. 1-3, 5, and 6. Each clamp in the assembly connects to a vertical round tube that serves as a leg. Each leg will hold one or more horizontal sections of assembled piping and the result is a stand-alone system of interlocking pipes and clamps that will hold other clamps and accessory arms. These units are height adjustable, interlock at various angles, and fold up with ease, FIGS. 54-56. Sizes and dimensions of components may vary. (Original drawings, FIGS. 1-7, are actual size.)

FIG. 8 is an aerial view of a round tube memory clamp, (RMC). It will secure to the vertical leg tubing and interlock with other geared clamps, usually on the bottom. The plastic RMC clamp body 15 is hinged to the plastic RMC clamp arm with a metal pin 5, as shown in FIGS. 8, 9, and 11. There are 3 pivot points in this clamp. This becomes 1 of 3. The metal t-nut 8 will fit into the t-nut housing 7 on the plastic RMC clamp body 15, FIG. 9. This is pivot point 2 of 3. This is designed so the user can replace hardware that has become damaged. A tension rod 9 is inserted into a concave washer 10 and a cylinder 11 with a hole is inserted into an easy locking lever 12. The easy locking lever 12 is "U"-shaped to allow the tension rod 9 to pass through. This is pivot point 3 of 3. The tension rod 9 and concave washer 10 are then inserted into the hole in the cylinder 11 and screwed into the t-nut 8 and will be ready to use; as shown in FIG. 7.

Operation

This clamp assembly will usually be overlapped horizontally by a section of assembled piping and will interlock at various and precise angles. This is accomplished through having a raised-geared teeth 13 design on the top and bottom face of the clamp, FIGS. 8-11. These clamps will be used for "memory" purposes only. This means they will be used as a place of reference for future set-ups. Sizes and dimensions of components may vary. (Original drawings, FIGS. 8-11, are actual size.)

FIG. 12 is an aerial view of an octagonal tube rack-arm clamp with an adapter hole, (RAC-38). This clamp will secure to the horizontal octagonal pipe assembly and support one accessory arm and an adapter rod. The plastic RAC-38 clamp body 16 is hinged to a horizontal mounting octagonal clamp arm 17 with a pin 5. The RAC-38 clamp body is also hinged to a usually vertically mounting clamp arm-A 18. There are six pivot points on this clamp. These are the first two. The t-nut(s) 8 will fit into the t-nut housing(s) 7 on the plastic RAC-38 clamp body, as shown in FIG. 13 and FIG. 14; pivot points 3 and 4. This is designed so the user can replace hardware that has become damaged. Tension rod(s) 9 are inserted into concave washer(s) 10 and cylinder(s) 11 with holes are inserted into easy locking lever(s) 12; pivot points 5 and 6. The easy locking lever 12 is "U"-shaped to allow the tension rod 9 to pass through. The tension rod(s) 9 are then screwed into the t-nut(s) 8 and are ready to use. (Refer to FIG. 7) There is an Allen screw 20 installed into the side of the RAC-38 clamp body 16 and a perpendicular hole 19 will allow an adapter rod to pass through and be clamped down with the Allen screw key, as shown in FIGS. 12-14 and FIG. 17.

Operation

The overall purpose of this clamp is to secure to an octagonal tube horizontally, lock on without "rack slippage," and hold an arm for percussion mounting; usually in a vertical fashion, along with a vertical adapter rod accessory; (i.e. cowbell, woodblock, or tambourine.) This will provide a stable base and allow more weight to be added to each clamp. Sizes and dimensions of components may vary. (Original drawings, FIGS. 12-17 are actual size.)

FIG. 18 is an aerial view of an octagonal tube rack-double arm clamp with an adapter hole, (RAC2-38). This will secure to the horizontal octagonal pipe assembly and support two accessory arms and one adapter rod. The plastic RAC2-38 clamp body 21 is hinged to a horizontal mounting octagonal clamp arm 17 with a pin 5. The RAC2-38 clamp body 21 is also hinged to two opposing, usually vertically mounting clamp arm(s)-A 18 with pin(s) 5. There are nine pivot points on this clamp. These are the first three. The t-nut(s) 8 will fit into the t-nut housing(s) 7 on the plastic RAC2-38 clamp body 21; FIG. 19, pivot points 4-6. This is designed so the user can replace hardware that has become damaged. Tension rod(s) 9 are inserted into concave washer(s) 10 and cylinder (s) 11 with holes are inserted into easy locking lever(s) 12, pivot points 7-9. These easy locking lever(s) 12 are "U"-shaped to allow the tension rod(s) 9 to pass through. The tension rod(s) 9 are then screwed into the t-nut(s) 8 and will be ready to use. (Refer to FIG. 7) There is an Allen screw 20 installed into the side and a perpendicular hole 19 will allow an adapter rod to pass through and be clamped down with the Allen screw key, as shown in FIGS. 18-21. This will allow the user to mount any accessory he or she may want.

Operation

The overall purpose of this clamp is to mount horizontally to an octagonal tube, lock onto the rack without "rack slippage," and hold two vertical accessory arms for percussion mounting, along with an adaptor rod. This will provide a stable base, and allow more weight to be added to each clamp. Sizes and dimensions of components may vary. (Original drawings, FIGS. 18-21 are actual size.)

FIG. 22 is an aerial view of a round tube leg-arm clamp, (LAC). This will secure to the vertical round tube leg and interlock with the rack tubing assembly clamp portion. This is accomplished through having a raised-geared teeth 13 design on the tops and bottoms of the vertical leg clamp arm 23 and the vertical LAC clamp body 24, FIGS. 22-24, 26, and 27. These clamps will support one accessory arm. This plastic LAC clamp body 24 is hinged to a vertical mounting clamp arm-B 22 and a vertical mounting leg clamp arm 23; each with a pin 5; FIGS. 22 and 23. There are six pivot points in this clamp, these are the first two. Two t-nut(s) 8 will fit individually into the two t-nut housing(s) 7 on the plastic LAC clamp body 24, as shown in FIG. 23; pivot points 3 and 4. This is designed so the user can replace hardware that has become damaged. Two tension rod(s) 9 are inserted into two concave washer(s) 10 and two cylinder(s) 11 with holes are inserted into two easy locking lever(s) 12; pivot points 5 and 6. These two easy locking lever(s) 12 are "U"-shaped to allow the two tension rod(s) 9 to pass through. The two tension rod(s) 9 are then screwed into the two t-nut(s) 8 and will be ready to use. (Refer to FIG. 7)

Operation

The overall purpose of this clamp is to mount vertically to a round leg, interlock with the geared teeth of the rack piping assembly, and support one vertical accessory arm. This clamp allows vertical adjustment of accessory arms to suit user preference. Size and dimensions of components may vary. (Original drawings, FIGS. 22-27 are actual size.)

FIG. 28 is an aerial view of a round tube leg-arm clamp with an adapter hole, (LAC-38). This will secure to the vertical round tube leg and interlock with the rack tubing assembly clamp portion. This is accomplished through having a raised-geared teeth 13 design on the top and bottom of the vertical leg clamp arm 23 and the LAC-38 clamp body 25, FIGS. 28-31. This clamp will support one accessory arm and one adapter rod. There is an Allen screw 20 installed into the side and a perpendicular hole 19 will allow an adapter rod to pass through and be clamped down with the Allen screw key, as shown in FIGS. 28, 29, and 31. The plastic LAC-38 clamp body 25 is hinged to a vertical mounting clamp arm-B 22 with a pin 5. The LAC-38 clamp body 25 is also hinged to a vertical mounting leg clamp arm 23 with a pin 5; FIGS. 29 and 29. There are 6 pivot points in this clamp. These are the first two. Two t-nut(s) 8 will fit into two t-nut housing(s) 7 on the plastic LAC-38 clamp body 25, FIG. 29; pivot points 3 and 4. This is designed so the user can replace hardware that has become damaged. Two tension rod(s) 9 are inserted into two concave washer(s) 10 and two cylinder(s) 11 with holes are inserted into two easy locking lever(s) 12; pivot points 5 and 6. These two easy locking lever(s) 12 are "U"-shaped to allow the two tension rod(s) 9 to pass through. The two tension rod(s) 9 are then screwed into the two t-nut(s) 8 and will be ready to use. (Refer to FIG. 7)

Operation

The overall purpose of this clamp is to mount vertically to a round leg, interlock with the geared teeth of the rack piping assembly, and support one accessory arm and an adapter rod. This clamp allows vertical adjustment of accessory arms and adapter rods to suit user preference. Size and dimensions of components may vary. (Original drawings, FIGS. 28-31 are actual size.)

FIG. 32 is an aerial view of a round tube leg-double arm clamp with an adapter hole, (LAC2-38). This will secure to the vertical round tube leg and interlock with the rack assembly clamp portion. This is accomplished through having a raised-geared teeth 13 design on the top and bottom face of the vertical leg clamp arm 23 and the vertical LAC2-38 clamp arm 26, FIGS. 32-37. This clamp will support two accessory arms and one adapter rod. There is an Allen screw 20 installed into the side and a perpendicular hole 19 will allow an adapter rod to pass through and be clamped down with the Allen screw key, as shown in FIGS. 32-34. The plastic LAC2-38 clamp body 27 is hinged to a vertical mounting leg clamp arm 23 with a pin 5. The plastic LAC2-38 body 27 is also hinged to a vertical mounting LAC2-38 clamp arm 26 with a pin 5; FIGS. 32-34. There are 10 pivot points on this clamp. These are the first two. The LAC2-38 clamp body 27 is also hinged to two opposing, vertically mounting clamp arm(s)-A 18 with pin(s) 5; FIGS. 32-34, 36, and 37. These are pivot points 3 and 4. Three t-nut(s) 8 will fit individually into the three t-nut housing(s) 7 on the plastic LAC2-38 clamp body 27 and one on the LAC2-38 clamp arm 27, FIG. 33; pivot points 5, 6, and 7. This is designed so the user can replace hardware that has become damaged. Three tension rod(s) 9 are inserted into three concave washer(s) 10 and three cylinder(s) 11 with holes are inserted into three easy locking lever(s) 12; pivot points 8, 9, and 10. These three easy locking lever(s) 12 are "U"-shaped to allow the tension rod(s) 9 to pass through. The three tension rod(s) 9 are then screwed into the three t-nut(s) 8 and will be ready to use. (Refer to FIG. 7)

Operation

The overall purpose of this clamp is to mount vertically to a round leg, interlock with the geared teeth of the rack piping assembly, and support two vertical accessory arms and an adapter rod. This clamp allows vertical adjustment of accessory arms and adapter rods to suit user preference. Size and dimensions of components may vary. (Original drawings, FIGS. 32-37 are actual size.)

FIG. 38 is an aerial view of a round tube leg-triple clamp with an adapter hole, (LAC3-38). This will secure to the vertical round tube leg of the rack. The piping will extrude through the center of the clamp body and will secure to the vertical round tube leg and interlock with the rack assembly clamp portion. This is accomplished through having a raised-geared teeth 13 design on the bottom of the leg clamp arm 23 and the LAC3-38 clamp body 28, FIGS. 38, 39, and 41. This clamp will support three accessory arms and one adapter rod. There is an Allen screw 20 installed into the side and a perpendicular hole 19 will allow an adapter rod to pass through and be clamped down with the Allen screw key, as shown in FIGS. 38-41. The plastic LAC3-38 clamp body 28 is hinged to a leg clamp arm 23 with a pin 5 on the bottom of the clamp assembly, FIGS. 38-41. There are 12 pivot points on the entire body of the clamp. This is the first one. There are three clamp arm(s)-B 22 attached on the outside of the LAC3-38 clamp body 28 with pin(s) 5. These are pivot points 2-4. Four t-nut(s) 8 will fit individually into the four t-nut housing (s) 7 on the plastic LAC3-38 clamp body in four places; three on the corners of the clamps, and one in the middle, raised-geared portion of the clamp, FIGS. 38 and 39. These become pivot points 5-8. This is designed so the user can replace hardware that has become damaged. Four tension rod(s) 9 are inserted into four concave washer(s) 10 and four cylinder(s) 11 with holes are inserted into four easy locking lever(s) 12; pivot points 9, 10, 11, and 12. These four easy locking lever(s) 12 are "U"-shaped to allow the tension rod(s) 9 to pass through. The four tension rod(s) 9 are then screwed into the four t-nut(s) 8 and will be ready to use. (Refer to FIG. 7)

Operation

The overall purpose of this clamp is to rest around the vertical leg tube of the rack, straddle the horizontal piping assembly and interlock with the geared portion of the clamp. This clamp will hold up to three vertical accessory arms and one adapter rod. Sizes and dimensions may vary. (Original drawings, FIGS. 38-41 are actual size.

FIG. 42 is an aerial view of an arm-adapter hole clamp, (A-38). This will attach to a pre-existing accessory arm on the rack, as another option for mounting any instrument that uses an adapter rod. There is an Allen screw 20 installed into the side and a perpendicular hole 19 will allow an adapter rod to pass through and be clamped down with the Allen screw key, as shown in FIGS. 42-44. The plastic A-38 clamp body 29 is hinged to a clamp arm-A 18 with a pin 5, FIGS. 41 and 42.

There are three pivot points on the entire clamp. This is 1 of three. A t-nut 8 will fit into the t-nut housing 7 on the plastic A-38 body 29, FIGS. 42 and 43. This is pivot point 2 of 3. This is designed so the user can replace hardware that has become damaged. A tension rod 9 is inserted into a concave washer 10 and a cylinder 11 with a hole is inserted into an easy locking lever 12; pivot point 3. This easy locking lever 12 is "U"-shaped to allow the tension rod 9 to pass through. The tension rod 9 is then screwed into the t-nut 8 and is ready to use. (Refer to FIG. 7)

Operation

The overall purpose of this clamp is to mount vertically to an accessory arm and support one vertical adapter rod and accessory; (i.e. cowbell, woodblock, tambourine.) Sizes and dimensions may vary. (Original drawings, FIGS. 42-44 are actual size.

FIG. 45 is an aerial view of an arm-arm clamp, (AAC). This will attach to a pre-existing arm on the rack, as another option of mounting any accessory arms. The plastic AAC clamp body 30 is hinged to two clamp arm(s)-B 22 with two pin(s) 5; opposite each other, FIGS. 45 and 46. There are six pivot points on this clamp. These are the first two. Two t-nut(s) 8 will fit individually into the t-nut housing(s) 7 on the plastic AAC clamp body 30, FIGS. 46-47. These are pivot points 3 and 4. This is designed so the user can replace hardware that has become damaged. Two tension rod(s) 9 are inserted into two concave washer(s) 10 and two cylinder(s) 11 with a hole and inserted into two easy locking lever(s) 12; pivot points 5 and 6. These two easy locking lever(s) 12 are "U"-shaped to allow the two tension rod(s) 9 to pass through. The two tension rod(s) 9 are then screwed individually into the two t-nut(s) 8 and are ready to use. (Refer to FIG. 7)

Operation

The overall purpose of this clamp is to mount to a pre-existing accessory arm on the rack and support another accessory arm. This is to provide a lighter clamp with the same mounting option for a user, without taking up precious rack pipe space. Sizes and dimensions may vary. (Original drawings, FIGS. 45-47 are actual size.

FIG. 48 is an aerial view of an arm-arm clamp with an adapter hole, (AAC-38). This will attach to a pre-existing arm on the rack, as another option for mounting an accessory arm and any instrument that uses an adapter rod. The plastic AAC-38 body 31 has two clamp arm(s)-B 22 attached individually with pin(s) 5, opposing each other; FIGS. 48 and 49. There are six pivot points on this clamp. These are the first two. Two t-nut(s) 8 will fit individually into the t-nut housing (s) 7 on the plastic AAC-38 body 31, FIGS. 48 and 49. These are pivot points 3 and 4. This is designed so the user can replace hardware that has become damaged. Two tension rod(s) 9 are inserted into two concave washer(s) 10 and two cylinder(s) 11 with a hole and inserted into two easy locking lever(s) 12; pivot points 5 and 6. These two easy locking lever(s) 12 are "U"-shaped to allow the two tension rod(s) 9 to pass through. The two tension rod(s) 9 are then screwed individually into the two t-nut(s) 8 and are ready to use. (Refer to FIG. 7)

Operation

The overall purpose of this clamp is to mount vertically to an accessory arm and support one accessory arm and an adapter rod and accessory; (i.e. cowbell, woodblock, tambourine.) This is to provide a lighter clamp with the same mounting option for a user, without taking up precious rack pipe space. Sizes and dimensions may vary. (Original drawings, FIGS. 48-49 are actual size.

FIG. 50 is an aerial view of an arm-double arm clamp with an adapter hole, (AAC2-38). This will attach to a pre-existing arm on the rack, as another option for mounting two accessory arms and any instrument that uses an adapter rod. The plastic AAC2-38 body 32 has three clamp arm(s)-B 22 attached individually with pin(s) 5, opposing each other in a triangular pattern; FIGS. 50 and 51. There are nine pivot points on this clamp. These are the first three. Three t-nut(s) 8 will fit individually into the t-nut housing(s) 7 on the plastic AAC2-38 body 32, FIGS. 50 and 51. These are pivot points 4, 5, and 6. This is designed so the user can replace hardware that has become damaged. Three tension rod(s) 9 are inserted into three concave washer(s) 10 and three cylinder(s) 11 with a hole and inserted into three easy locking lever(s) 12; pivot points 7, 8, and 9. These three easy locking lever(s) 12 are "U"-shaped to allow the three tension rod(s) 9 to pass through. The three tension rod(s) 9 are then screwed individually into the three t-nut(s) 8 and are ready to use. (Refer to FIG. 7)

Operation

The overall purpose of this clamp is to mount vertically to a pre-existing accessory arm and support one accessory arm and an adapter rod and accessory; (i.e. cowbell, woodblock, tambourine.) This is to provide a lighter clamp with the same mounting option for a user, without taking up precious rack pipe space. Sizes and dimensions may vary. (Original drawings, FIGS. 50-52 are actual size.

FIG. 53 is a drum microphone adapter that drummers will use and insert into any TRSeries clamp with an adapter hole. A section of knurled rod 33 is attached to a section of gooseneck assembly 34 with pin(s) 5. The gooseneck assembly 34 is attached to a microphone mount screw 35. In FIG. 53, the length is 8" and will vary to accommodate user preference. The drummer will insert the entire assembly into the perpendicular hole 19 and will clamp it down with an Allen screw 20 (FIG. 57). The user will then mount whatever drum microphone they desire onto the provided microphone mount screw 35.

Operation

FIG. 53 is a drum microphone adapter that drummers will use and insert vertically into any TRSeries clamp with an adapter hole. Drummers will no longer have to mount the drum microphones to the rim of the drum, inhibiting the resonance of the shell, or scratching the rim finish. Microphones may perform better due to the solid base platform. Sizes and dimensions may vary. (Original drawing, FIG. 53 is actual size.)

FIG. 54 is a front view of the drum rack system in an open position. This particular setup contains four vertical legs, three horizontal rack bars, and four mounting clamps. This rack would be considered a basic drum rack. Other clamp components may be added to suit the user.

FIG. 55 shows an aerial view of the FIG. 54 in an open position with an illustration of how the side arms could fold in for easy storage.

FIG. 56 shows an aerial view of FIG. 54 in a closed position with an illustration of how the side arms have been folded up for storage Operation FIGS. 54-56 are to be considered a basic setup. This particular setup consists of four vertical legs, three horizontal bars, and four accessory arm clamps. The user would generally set the horizontal main bar at a pre-selected height, parallel above the floor. The user would then set the side bars at a similar height parallel above the floor. The clamps at either end of the main bar would overlap at various angles with the clamps on the side bars so the rack can maintain the look and feel once it has been setup. The user would then add the accessory arm clamps to the octagonal bars and mount the percussion arms to the clamps. The end result is a repeatable drum setup. To fold in the drum rack, the user would flip the levers to open and fold each arm of the rack, collapsing into itself for storage (FIGS. 55-56).

CONCLUSIONS, RAMIFICATIONS, AND SCOPE

Accordingly, the reader will see that the TRSeries Drum Rack System will provide drummers with stability without sacrificing security. It will offer quiet performance and ease of use. This rack will be adaptable to future add-ons and give the user multiple mounting options. Furthermore, the TRSeries Drum Rack System has the additional advantages in that extra hardware may be mounted such as cowbells, woodblocks, or tambourines. Microphones are easily mounted to this setup. This rack will provide reliability, comfort, and give peace of mind.

Although the description above contains very accurate drawings and much specificity, these should be construed as limiting the scope of the embodiments but as merely providing illustrations of several embodiments. For example, the rack and clamps can be made of a variety of materials; the entire rack and clamps can be made in a variety of colors; the horizontal pipe ends could have end caps; the rack could use a different style of piping such as oval, triangular, square, hexagonal, decagonal, etc.; the tension rods could be a larger bolt.

Thus the scope of the embodiments should be determined by the appended claims and their legal equivalents, rather than by the examples given.

I claim:

1. In a percussion drum rack system device of the type consisting of a plurality of generally horizontal rail members, a plurality of plastic clamp members, and a plurality of support means, the improvement wherein said device contains insulated eight-sided rail members attached to interlocking plastic end clamps; said horizontal rail members providing attachment and horizontal movement of separate multi-functioning plastic support clamps; said rack system also having a vertical plastic connecting support means; said vertical connecting means providing attachment and vertical movement of separate multi-functioning and interlocking plastic support clamps; said plastic support clamps having a housing for a removable tensioning device; and wherein said support clamps allow vertical movement of percussion arms attached thereto.

* * * * *